(12) United States Patent
Deng

(10) Patent No.: US 10,809,411 B2
(45) Date of Patent: Oct. 20, 2020

(54) METAL DETECTION DEVICES

(71) Applicant: Maoquan Deng, Covina, CA (US)

(72) Inventor: Maoquan Deng, Covina, CA (US)

( * ) Notice: Subject to any disclaimer, the term of this patent is extended or adjusted under 35 U.S.C. 154(b) by 253 days.

(21) Appl. No.: 15/839,466

(22) Filed: Dec. 12, 2017

(65) Prior Publication Data

US 2018/0252835 A1 Sep. 6, 2018

Related U.S. Application Data

(60) Provisional application No. 62/523,053, filed on Jun. 21, 2017.

(30) Foreign Application Priority Data

Mar. 2, 2017 (CN) .......................... 2017 1 0120844

(51) Int. Cl.
| | |
|---|---|
| *G01V 3/10* | (2006.01) |
| *G01V 3/165* | (2006.01) |
| *G08B 21/24* | (2006.01) |
| *H04W 4/02* | (2018.01) |
| *G08B 25/08* | (2006.01) |

(52) U.S. Cl.
CPC .............. *G01V 3/105* (2013.01); *G01V 3/104* (2013.01); *G01V 3/165* (2013.01); *G08B 21/24* (2013.01); *G08B 25/08* (2013.01); *H04W 4/02* (2013.01)

(58) Field of Classification Search
CPC ........ G01V 3/105; G01V 3/165; G01V 3/104; G08B 21/24; G08B 25/08; H04W 4/029; H04W 4/02
See application file for complete search history.

(56) References Cited

U.S. PATENT DOCUMENTS

| 6,809,520 B1 * | 10/2004 | Nelson | G01V 3/15 324/239 |
|---|---|---|---|
| 2012/0068837 A1* | 3/2012 | Balakrishnan | B60R 25/00 340/426.1 |
| 2013/0082865 A1* | 4/2013 | Duvoisin, III | H01Q 1/273 342/22 |
| 2014/0218036 A1* | 8/2014 | Fry | G01V 3/104 324/329 |
| 2016/0217578 A1* | 7/2016 | Can | G01V 3/12 |
| 2016/0238583 A1* | 8/2016 | Kodzius | G01N 27/48 |

OTHER PUBLICATIONS

Prathusha Perugu, An Innovative Method using GPS Tracking, WINS Technologies for Border Security and Tracking of Vehicles, 2010, IEEE, pp. 130-133 (Year: 2010).*

* cited by examiner

*Primary Examiner* — Mischita L Henson

(57) ABSTRACT

A metal detection system includes a detection module, a control module, a positioning module, and a computer module. The detection module includes an electromagnetic wave emitter that emits electromagnetic waves, and an electromagnetic wave receiver that senses electromagnetic signals emitted by underground metal in response to the electromagnetic waves emitted by the electromagnetic wave emitter. The control module processes the electromagnetic signals received by the electromagnetic wave receiver and generates metal detection data based on the received electromagnetic signals, or processes output signals provided by the detection module and generates metal detection data based on the output signals provided by the detection module. The positioning module generates information about positions of the metal detection device over time.

36 Claims, 22 Drawing Sheets

METAL DETECTION DEVICES

CROSS-REFERENCE TO RELATED APPLICATIONS

This application claims priority to Chinese application 201710120844.3, filed on Mar. 2, 2017, and U.S. provisional application 62/523,053, filed on Jun. 21, 2017. The entire contents of the above applications are incorporated by reference.

TECHNICAL FIELD

This subject matter is generally related to metal detection devices.

BACKGROUND

Metal detectors can be used to detect underground metal objects. In some examples, a metal detector includes a probe that has a transmitter coil and a receiver coil. The transmitter coil generates an oscillating magnetic field that induces oscillating eddy currents in an underground metal object, which in turn generates a second oscillating magnetic field around the metal object. The second oscillating magnetic field causes an oscillating current to flow in the receiver coil, which is amplified and used to drive a loudspeaker or headphone. This way, when the user sweeps the probe over an underground metal object, the loudspeaker generates a clicking or beeping sound, notifying the user of the existence of the underground metal object.

SUMMARY

In general, in one aspect, a metal detection system is provided. The metal detection system includes a detection module, a control module, a positioning module, and a computer module. The detection module includes a first electromagnetic wave emitter configured to emit electromagnetic waves to a region in a vicinity of the metal detection device, and a first electromagnetic wave receiver configured to sense electromagnetic signals emitted by underground metal in response to the electromagnetic waves emitted by the electromagnetic wave emitter. The control module is configured to perform at least one of (i) processing the electromagnetic signals received by the electromagnetic wave receiver and generating metal detection data based on the received electromagnetic signals, or (ii) processing output signals provided by the detection module and generating metal detection data based on the output signals provided by the detection module, in which the output signals are derived from the electromagnetic signals received by the electromagnetic wave receiver. The positioning module is configured to generate information about positions of the metal detection device. The computer module includes a storage device configured to store an application program, and a data processor. The data processor is configured to execute instructions in the application program and perform: based on the information about positions of the metal detection device generated by the positioning module, showing locations that the metal detection device has traveled on a map; and based on the metal detection data, overlaying information indicating whether metal was detected at the locations traveled by the metal detection device on the map.

In general, in another aspect, a method for processing metal detection information is provided. The method includes transmitting, from an electromagnetic wave emitter of a metal detection device, electromagnetic waves to an underground region in a vicinity of the electromagnetic wave emitter. The method includes detecting electromagnetic signals emitted by underground metal in response to the electromagnetic waves emitted by the electromagnetic wave emitter, processing the electromagnetic signals, and generating metal detection data based on the received electromagnetic signals. The method includes determining positions of the metal detection device, and based on the information about positions of the metal detection device, showing locations that the metal detection device has traveled on a map. The method includes, based on the metal detection data, overlaying information indicating whether metal was detected at the locations traveled by the metal detection device on the map.

The details of one or more of the above aspects and implementations are set forth in the accompanying drawings and the description below. Other features, aspects, and advantages will become apparent from the description, the drawings, and the claims.

BRIEF DESCRIPTION OF DRAWINGS

Like reference symbols in the various drawings indicate like elements.

DETAILED DESCRIPTION

This disclosure provides a novel metal detection system that enables a user to process metal detection data intelligently. The system integrates multiple functions, including metal detection, mapping, sharing of information with other people, and searching for lost gears. Metal detection data can be overlaid on one or more maps to enable the user to easily see what regions have been explored and what types of metal objects have been detected at what locations. This information is useful for reviewing past exploration activities and planning for future exploration activities. A user-friendly interface is provided to allow the user to share information related to the metal detection activities with friends on social media in a convenient manner. Firmware for components of the metal detection system can be updated conveniently. The system can provide feedback to the user on the proper way to use a metal detector. The system can assist in finding lost metal detection gears.

Figure 1:
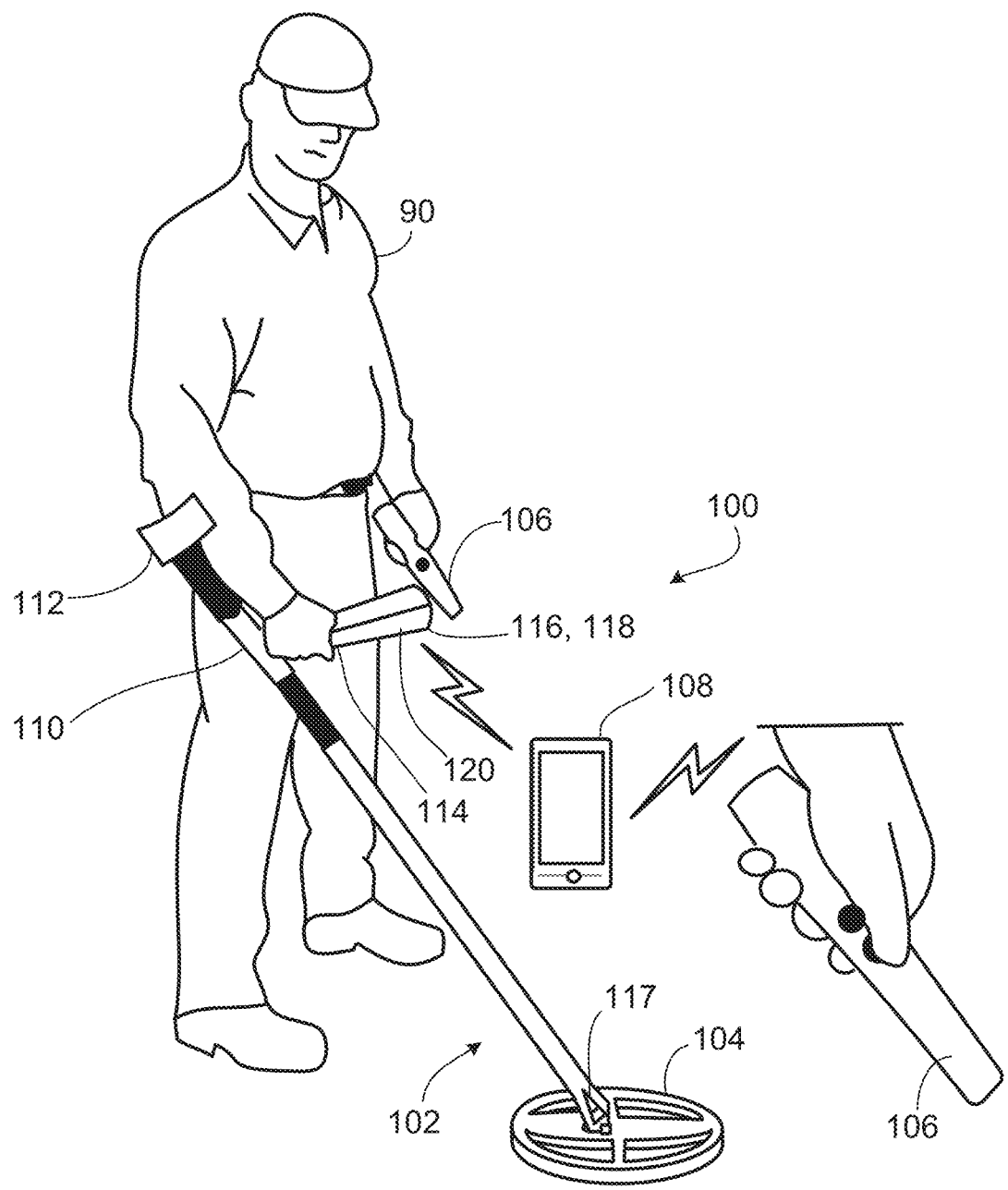
FIG. 1 is a diagram of a user operating a metal detection system.

FIG. 1 is a diagram showing a user 90 using an exemplary metal detection system 100 that includes a metal detection device 102 having a detection module 104, a pinpointing probe 106, and a mobile computing device 108. The metal detection device 102 includes a support 110 having an arm support 112 and a handle 114 to allow the user 90 to comfortably hold the metal detection device 102. The detection module 104 includes one or more coils and can have, e.g., a disc shape. The detection module 104 is coupled to a distal end 117 of the support 110, in which the angle between the detection module 104 and the support 110 can be adjusted to allow the detection module 104 to be substantially parallel to the ground surface as the user 90 sweeps the detection module 104 across the ground surface in search of buried metal objects. The metal detection device 102 includes a control module 116 and a communication module 118 that are enclosed within a housing 120.

The detection module 104 includes an electromagnetic wave emitter configured to emit electromagnetic waves to a region in a vicinity of the detection module 104, and an electromagnetic wave receiver configured to sense electromagnetic signals emitted by underground metal in response to the electromagnetic waves emitted by the electromagnetic wave emitter. In some implementations, the control module 116 communicates wirelessly, through the communication module 118, with the portable computing device 108. The portable computing device 108 can communicate wirelessly to remote server computers, such as a cloud server, through a network, such as the Internet. The pinpointing probe 106 enables more accurate determination of the positions of the underground metal objects.

Figure 2:
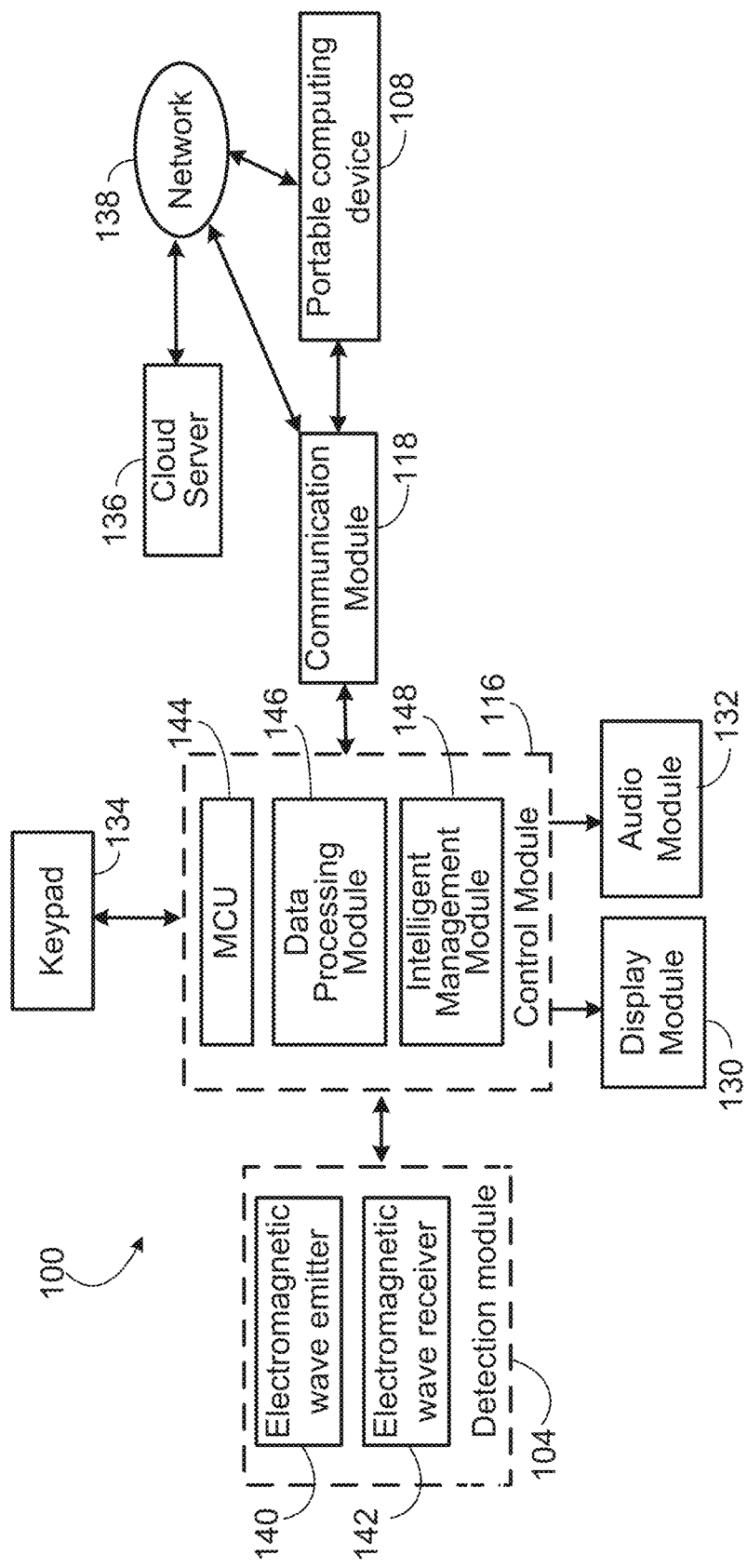
FIG. 2 is a block diagram of the metal detection system.

FIG. 2 is an exemplary block diagram of the metal detection system 100. As described previously, the metal detection system 100 includes a control module 116, a detection module 104, a communication module 118, and a portable computing device 108. The system 100 also includes a display module 130, an audio module 132, and a keypad 134. The display module 130 and the audio module 132 are enclosed by the housing 120. The housing 120 also encloses the circuitry for the keypad 134. The metal detection system 100 can include additional components, or have fewer components, and the components shown in the figure can be replaced with other components while still being within the scope of the invention. For example, a touch pad can be provided to enable the user 90 to control a cursor and select objects in a user interface shown on the display module 130. The display module 130 can be used in combination analog meters that indicate signal strengths.

The communication module 118 can communicate wirelessly with the portable computing device 108, using for example, Bluetooth or Wi-Fi protocol. The portable computing device 108 can communicate with a cloud server 136 through a network 138, which can be the Internet. The portable computing device 108 can be, e.g., a mobile phone that connects to a network router using Wi-Fi, or to a cellular base station using a cellular communication protocol, such as the Global System for Mobile Communications (GSM) or Long Term Evolution (LTE) protocol. In some examples, the communication module 118 can also communicate with the cloud server 136 through the network 138, e.g., using a Wi-Fi protocol or a cellular communication protocol.

The detection module 104 includes an electromagnetic wave emitter 140 and an electromagnetic wave receiver 142. The electromagnetic wave emitter 140 includes a transmitter coil, and the electromagnetic wave receiver 142 includes a receiver coil. When the detection module 104 is positioned near the ground surface, the control module 116 controls circuitry to cause an alternating current to flow in the transmitter coil, causing the transmitter coil to generate an oscillating magnetic field that can penetrate the ground surface and reach underground metal objects. When there is an underground metal object near the detection module 104, the oscillating magnetic field induces oscillating eddy currents in the metal object, which in turn generates a second oscillating magnetic field around the metal object. The second oscillating magnetic field causes an oscillating current to flow in the receiver coil, in which the oscillating current is amplified and processed by the control module 116.

Based on the signals detected by the electromagnetic wave receiver 142, the control module 116 controls the audio module 132 to generate an audio signal that is output by a loudspeaker or a headphone to the user 90. The control module 116 can also control the display module 130 to show text and images based on the signals detected by the electromagnetic wave receiver 142.

The keypad 134 allows the user 90 to enter commands and parameter values to the control module 116. In some implementations, the control module 116 includes a microcontroller unit (MCU) 144, a data processing module 146, and an intelligent management module 148. The data processing module 146 processes the received electromagnetic wave information to generate processed data that provide information about whether a metal object has been detected, and if a metal object has been detected, the type of metal object that has been detected. In some implementations, the data processing module 146 can have the following functions: (i) estimate the depths of metal objects, (ii) identify the types of metal objects, (iii) control the touch pad or keypad, and (iv) control the display module.

In some implementations, the data processing module 146 can determine the types of metal by, e.g., calculating the phase shift of the detected signals. Because the signal received from any given metal object exhibits its own characteristic phase shift, it is possible to classify different types of metal objects and distinguish between them. For example, a silver dime can cause a larger phase shift compared to that caused by an aluminum pull-tab, so the metal detector can be set to sound off on a dime yet remain quiet on a pull-tab, and/or show the identification of the target on a display or a meter. This process of distinguishing between metal targets is referred to as "discrimination." The data processing module 146 can process the received electromagnetic wave information and perform discrimination on the metal objects.

The intelligent management module 148 generates text, audio signals, and/or images based on the operation mode of the metal detector and the processed data provided by the data processing module 146. For example, the text may show the operation mode of the metal detector, in which the operation mode can include, e.g., all-metal mode, full-discriminate mode, tone discriminate mode, or pinpoint mode. The text may describe the type of metal object that has been detected, such as dimes, quarters, half-dollars, copper pennies, or pull-tabs. The images can include icons that provide visual cues for identifying the metal objects. The text can describe the estimated depth of the metal object under the ground surface. Different types of audio signals can be generated to indicate detection of different types of metal objects.

The microcontroller unit 144 controls the operation of the data processing module 146 and the intelligent management module 148. The microcontroller unit 144 can include firmware that affects the operation of the microcontroller unit 144, such as how the microcontroller unit 144 controls the data processing module 146 and the intelligent management module 148. In some implementations, the control module 116 can update the firmware by downloading updated firmware wirelessly from the computing device 108, which downloads the updated firmware from the cloud server 136. This way, the firmware can be updated while the user 90 is outside in the field engaging in exploration activities.

The control module 116 includes an accelerometer (not shown in the figure) that senses movements of the metal detection device 102 and generates signals that can be used to determine the scanning or sweeping movements of the metal detection device 102. For example, the user 90 can move the metal detection device 102 in a left-right back-and-forth sweeping motion. The signals from the accelerometer can be used to determine the scanning frequency of the metal detection device 102, e.g., the frequency of the left-right back-and-forth sweeping motion. If the frequency of the sweeping or scanning motion is too high (or low), indicating that the user 90 is moving the metal detector too fast (or slow), the ability of the metal detection system 100 to detect metal objects may be reduced.

A feature of the metal detection system 100 is that an application program can be executed on the portable computing device 108 to process information provided by the control module 116 and provide useful functions based on the processing of the information. In the following, the application program will be referred to as the "metal detection program" or "metal detection app." For example, the mobile computing device 108 can be a mobile phone, and the "metal detection app" can be an application program that is downloaded from an app store or from the web site of the manufacturer of the metal detection system 100. For example, the control module 116 can send signals from the accelerometer to the metal detection program. The signals from the accelerometer can indicate that the metal detection device accelerates in a first direction, decelerates, stops, then accelerates in a second or reverse direction, decelerates, stops, then accelerates in the first direction again.

For example, based on the timings of the accelerations and decelerations, the metal detection program can determine the frequency of the sweeping motion. When the accelerometer is part of the control module 116 or installed in the housing 120, the measurements from the accelerometer can be used to determine the frequency of the sweeping movements of the detection module 104 and to estimate the speed of movements of the detection module 104. In some implementations, the accelerometer can be installed at the detection module 104 near the transmitting coil. Based on the timing and amount of measured accelerations and decelerations, measurements from the accelerometer can be used to determine the speed of movement and the frequency of the sweeping movements of the detection module 104, which can be shown on a display.

In some implementations, the metal detection program can determine the environmental conditions and give recommendations according to the environmental conditions. For example, based on the signals provided by the control module 116, the metal detection program can determine the number of metal objects in the region being explored. If there is a large number of metal objects, the metal detection program can recommend the user 90 to sweep the detection module 104 slower so as not to miss a metal object. If there are very few metal objects, the metal detection program can recommend the user 90 to sweep the detection module 104 faster to cover more ground faster.

In some implementations, the metal detection program can communicate with the cloud server 136 and access a database having information about the underground conditions at various geographical regions. The computing device 108 can have a positioning module, such as a global positioning system (GPS) module that enables the computing device 108 to determine its location. The metal detection program can obtain positioning information from the positioning module, and look up the database to obtain information about the underground conditions at the current location. The metal detection program can give recommendations to the user 90 about the detection module sweeping movements based on the current underground conditions.

For example, if the user 90 is exploring a first geographical region that likely has many potential buried treasures, the metal detection program can recommend the user 90 to move the detection module 104 within a first range of sweeping motion speed or frequency. If the user 90 is exploring a second geographical region that likely has very few buried metal objects, the metal detection program can recommend the user 90 to move the detection module 104 within a second range of sweeping motion speed or frequency. In some examples, the upper limit of the second range can be higher than the upper limit of the first range, thereby suggesting the user 90 to use a faster sweeping motion at areas with fewer potential metal objects than at areas with more potential metal objects.

In some implementations, users of the metal detection systems 100 can upload information about the metal detection activities, including what metal objects were found at what locations, to a database stored at the cloud server 136. Users of the metal detection systems 100 can download the information about other users' metal detection activities. If the user 90 is at a first location where many other users have reported findings of many interesting metal objects, the metal detection program can recommend the user 90 to use a slower sweeping motion because there is a higher probability of finding metal objects at the first location. If the user 90 is at a second location where many other users have reported that very few metal objects were found, the metal detection program can recommend the user 90 to use a faster sweeping motion because there is a lower probability of finding metal objects at the second location.

In some implementations, the metal detection device 102 can have multiple operating modes, in which different operating modes can be suitable for detecting different types of metal objects or detecting metal objects at different depths. The metal detection program can recommend a particular operating mode based on the information about the underground conditions provided by the cloud server 136.

In some implementations, the control module 116 has the capability of determining the sweeping motion frequency and the speed of movement of the detection module 104. The metal detection program can provide the recommended speed of movements of the detection module 104 for various detection modes to the control module 116. Afterwards, the control module 116 can determine whether the sweeping motion frequency or the movement speed of the detection module 104 is too high or low and cause the display module 130 to show a message suggesting the user to decrease or increase the speed or frequency of the sweeping motion. In this example, after the control module 116 obtains information about the recommended speed of movements of the detection module 104, the control module 116 can continue to monitor the sweeping motion speed and frequency and provide recommendations to the user 90 without communicating with the portable computing device 108.

When sweeping the detection module 104 across the ground surface, the user 90 should keep the transmitter and receiver coils parallel to the ground surface. Inexperienced users sometimes can have a tendency to lift the detection module 104 (which includes the transmitter and receiver coils) at the end of each sweep, which can result in a loss of detection depth. Based on the accelerometer signals, the metal detection program can determine whether the detection module 104 is lifted at the end of each sweep. For example, when the movement of the detection module 104 is parallel to a horizontal ground surface, the accelerometer will detect movements in the x and y directions (assuming that the ground surface is substantially parallel to the x-y plane). When the detection module 104 is lifted, the accelerometer will detect movements in the z direction. Based on the signals from the accelerometer, if the metal detection program determines that the detection module 104 is lifted at the end of each sweep, the metal detection program can send a signal to the control module 116, which causes the display module 130 to show a text message recommending that the user keep the detection module 104 parallel to the ground surface and not lift the detection module 104 at the end of each sweep.

In some implementations, the metal detection program can provide training for the user 90 on how to properly use the metal detection system 100. For example, the metal detection program can cause a text message or audio signal to be provided to the user 90 telling the user to move the detection module 104 left or right at a certain speed or frequency.

In some implementations, based on information provided by the accelerometer, the metal detection program can determine whether the sweeping motion is conducted in an overlapping manner so that the detection module 104 does not miss any area. For example, if the metal detection program determines that the user 90 is walking too fast such that there are gaps between the swept areas, the metal detection program can send a signal to the control module 116 that causes the display module 130 to show a text message recommending that the user walk slower in order to cover the ground surface more thoroughly.

The user 90 can plan the detection range on the computing device 108 using the metal detection program by drawing a region on a map indicating the planned exploration region. The metal detection program can, based on past exploration activities, mark on a map the areas where metal objects have been detected, and areas where no metal object was detected in different colors before starting the metal detection activity, so that the user 90 can review past exploration results and modify the detection route. The user 90 can add markings on the map to provide hints regarding which areas should be explored on a given trip.

The metal detection device 102 can include a keypad 134 that is electrically coupled to the control module 116. The user 90 adjusts the power switch, detection mode, performance setting, screen illumination, and the sound volume of the metal detection device 102 through the keypad 134. The metal detection device 102 has an audio module 132 that can be electrically connected to a loudspeaker, an audio output terminal, or a wireless audio transmitter module. The audio module 132 can provide a prompt audio signal when the receiver coil receives electromagnetic waves, indicating the possibility that a metal object has been detected.

The communication module 118 can be, e.g., a Bluetooth or Wi-Fi communication module. The portable computing device 108 can be, e.g., a smart watch, smart eyeglasses, a mobile phone, a tablet computer, or a notebook computer. The communication module 118 can receive information from the portable computing device 108, such as short message service (SMS) messages, news, call tips, so that the user 90 can browse or process information directly during metal detecting operations without taking his/her phone out of the pocket.

The metal detection device 102 enables the user 90 to share maps that are overlaid with colored exploration routes and colored markings showing locations where underground metal objects were found on the Internet. This allows users of the metal detection system to easily share the results of the metal detection activities. Furthermore, the firmware of the metal detection device 102 can be updated easily. The user does not have to send the chip storing the firmware back to the manufacturer in order to update the firmware, as may be needed in some conventional metal detectors. The metal detection device 102 can find lost metal detector modules or gears through positioning, and help users correct the scanning movements based on information from the accelerometer. The metal detection device 102 can provide soil structure information to the manufacturer through the metal detection program so that the manufacturer can either update the firmware of the metal detection system or update the metal detection program to achieve more effective metal detection.

In some implementations, the portable computing device 108 can receive information from the control module 116 and generate a map overlaid with information associated with the metal detection activity. For example, the map can be overlaid with markers showing the locations where the user 90 has already explored, and markers showing the locations where metal objects have been found. Different types of markers can be used to represent the different types of metal objects that were found. For example, markers having different colors or shapes can be used to represent different types of metal objects (e.g., ferrous/non-ferrous, small/medium/large size) that were found. For example, the map can also be overlaid with images of the metal objects after they have been dug up from the ground by the user 90.

In some implementations, the portable computing device 108 (e.g., mobile phone) has positioning capabilities. For example, the portable computing device 108 can have a global positioning system (GPS) module that can determine the location of the portable computer device 108. When the control module 116 sends information to the portable computing device 108 indicating that a metal object has been found, the portable computing device 108 records the current coordinates provided by the GPS module along with information about the metal object.

The intelligent management module 148 can provide user interfaces for the user 90 to post information about the metal detection activity to an application program executing on the portable computing device 108 or a website. For example, the application can be a program for accessing social media, such as Facebook. The website can be a social media web site, such as the website of Facebook. When the user 90 finds an interesting metal object, the metal detection system 100 allows the user 90 to quickly and easily share the excitement about the interesting find with friends. The user 90 can post a message stating that he or she found the interesting metal object. The user 90 can receive feedback from friends about the metal object, e.g., identification of the metal object and/or the historical and archeological significance of the metal object.

For example, the user 90 may find a coin with unfamiliar markings, and post a map showing the location where the coin was found and a picture of the coin on social media. A friend may provide feedback indicating that, based on the location and the picture, the coin likely belonged to a certain ancient civilization and is quite valuable. Based on the feedback, the user 90 may decide to spend more time exploring nearby areas to try to find similar coins or other artifacts. On the other hand, if the feedback indicates that the coin is quite common and not valuable, the user 90 may decide to move on and explore other locations.

In some examples, a traditional metal detector does not provide the functionality of allowing the user 90 to share metal detection information with others. The user would have to rely on the programs executing on the portable computing device 108 in order to share metal detection information. For example, the portable computing device 108 may have a positioning application program. When the traditional metal detector detects a metal object and emits a beep, the user can execute the positioning application program to determine the coordinates of the current location. The user can then execute an application for accessing social media, then manually type in the location coordinates and the type of metal that was found, and post the information on social media. By contrast, the metal detection system 100 makes it much easier for the user 90 to share metal detection information with others.

One of the advantages of the metal detection system 100 is that information obtained by the control module 116 can be easily transmitted to the portable computing device 108 and processed by programs executing on the portable computing device 108 without the need for the user to manually type in information obtained from the control module 116 into the portable computing device 108. This makes the metal detecting activity more enjoyable as compared to using the traditional metal detector.

In some implementations, the cloud server 136 can collect information from multiple users and aggregate metal detection information from multiple users. For example, a group of archeologists can explore the site of an ancient ruin, and each archeologist can be equipped with the metal detection system 100. When any archeologist finds a metal object, information about the find can be sent to the cloud server 136. The cloud server 136 keeps track of where the metal objects were found by the group of archeologists, the type of metal objects that were found, photos of the metal objects, and/or comments written by the archeologists about the findings of the metal objects. In some examples, the metal detector of each user can send information about the areas that have been explored to the cloud server 136. The cloud server 136 can send information about the findings of metal objects and the areas that have been explored by one user to other users in the group. This enables the display on the metal detector of each user in the group to show up-to-date information about the collective findings of metal objects by the users in the group. This also enables each user in the group to know which areas have been explored by the group collectively, and can go explore areas that have not been explored by any user in the group. The metal detection systems 100 allow the users to send messages to one another directly through the user interfaces of the metal detectors, in which the messages can include rich information such as maps, images, and video. This makes it convenient for the users to share information and coordinate their exploration activities.

The user interface can allow the user 90 to post a map overlaid with metal detection activity to the application program or the website. The user 90 can share with friends information about the routes that the user has taken, the locations where metal objects were found, and the types of metal objects that were found.

The intelligent management module 148 can provide user interfaces to enable the user 90 to keep track of metal detection activities for record keeping and to facilitate planning of future exploration activities. For example, the user 90 can plan exploration of a geographical region by marking a region on a map. When the user 90 goes to the geographical region to detect metal objects, a map can be shown on the display of the computing device 108, and the current location of the user 90 can be shown on the map so that the user 90 knows which direction to go to conduct the exploration activity. The metal detection program can also show markings on the map representing the areas that have not been explored.

Figure 3:
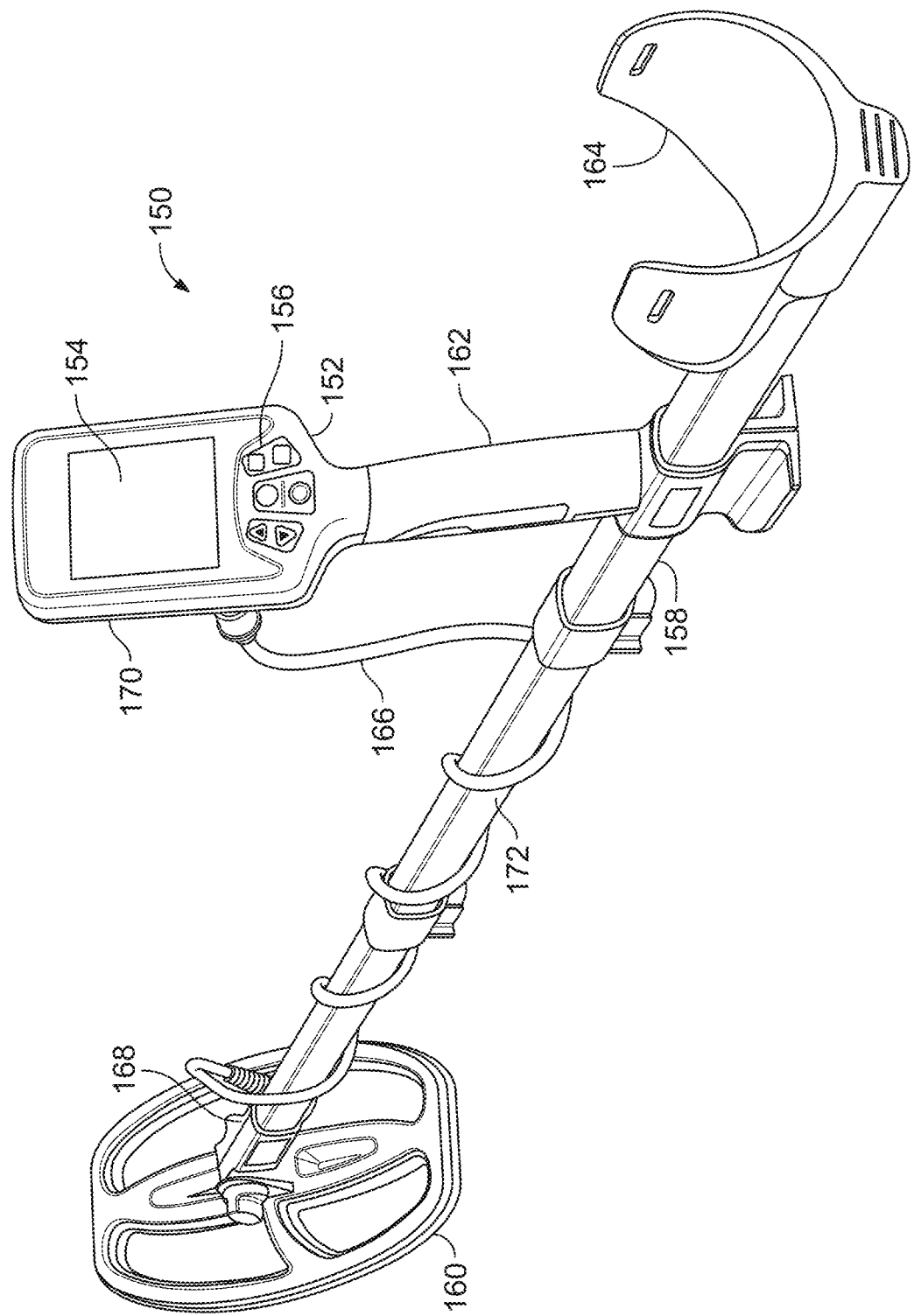
FIG. 3 is an image of a metal detection device.

FIG. 3 is an image of an exemplary metal detection device 150 that includes a control module 152, a display module 154, a keypad 156, a support 158, and a detection module 160. The support 158 includes a handle 162 and an arm support 164 coupled to a rod 172. For example, the control module 152 can be electrically connected to the detection module 160 through a cable 166. The detection module 160 includes at least one transmitter coil and at least one receiver coil. The detection module 160 is pivotly coupled to a distal end 168 of the support 158. The control module 152 is enclosed within a housing 170. The housing 170 also encloses an audio module and a communication module. The communication module enables the control module 152 to communicate wirelessly with a portable computing device, such as a smart watch, smart eyeglasses, a mobile phone, a tablet computer, or a notebook computer.

Figure 4:
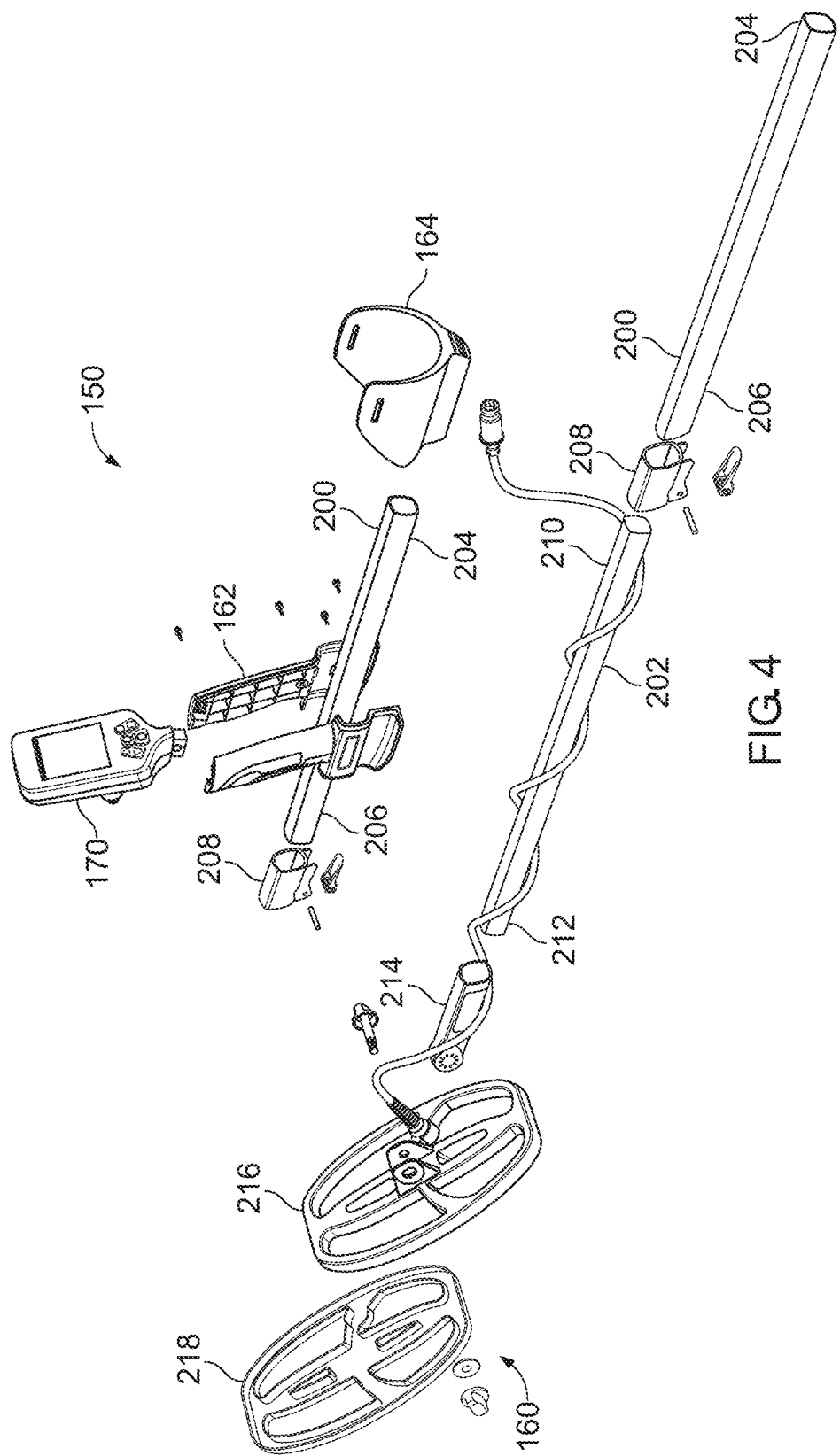
FIG. 4 shows an exploded view of the metal detection device.

FIG. 4 is an exploded view of the metal detection device 150. The support 158 includes a first elongated member 200 (or rod) and a second elongated member 202 (or rod). The handle 162 is attached to the first elongated member 200, and the housing 170 is attached to the handle 162. The arm support 164 is attached to a first end 204 of the first elongated member 200, and the second end 206 of the first elongated member 200 is attached to a first coupler 208. The coupler 208 and the first elongated member 200 are shown in duplicates in the figure. In this example, the device 150 has only one coupler 208 and one elongated member 200. A first end 210 of the second elongated member 202 is attached to the first coupler 208. A second end 212 of the second elongated member 202 is attached to a second coupler 214. The detection module 160 includes an upper housing member 216 and a lower housing member 218 that provide support for the transmitter coil and the receiver coil. The upper housing member 216 is pivotly coupled to the second coupler 214.

Figure 5:
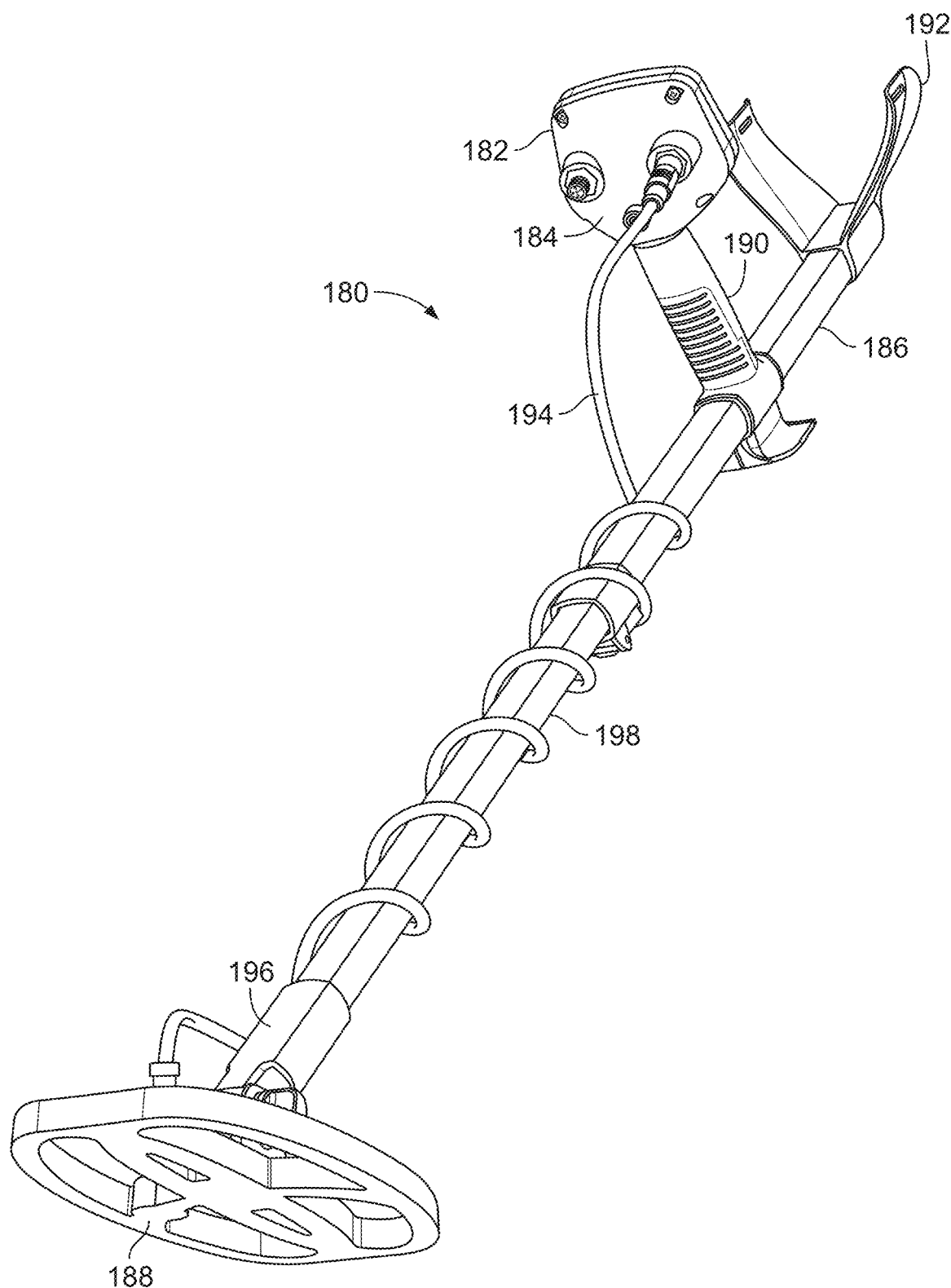
FIG. 5 is an image of another metal detection device.

FIG. 5 is an image of another metal detection device 180 that includes a control module 182 enclosed in a housing 184, a keypad, a support 186, and a detection module 188. The support 186 includes a handle 190 and an arm support 192 coupled to a rod 198. The control module 182 is electrically connected to the detection module 188 through a cable 194. The detection module 188 includes at least one transmitter coil and at least one receiver coil. The detection module 188 is pivotly coupled to a distal end 196 of the rod 198. The housing 184 also supports a display module, an audio module, a communication module, and circuitry for the keypad. The communication module enables the control module 182 to communicate wirelessly with a computing device, such as a smart watch, smart eyeglasses, a mobile phone, a tablet computer, or a notebook computer.

Figure 6:
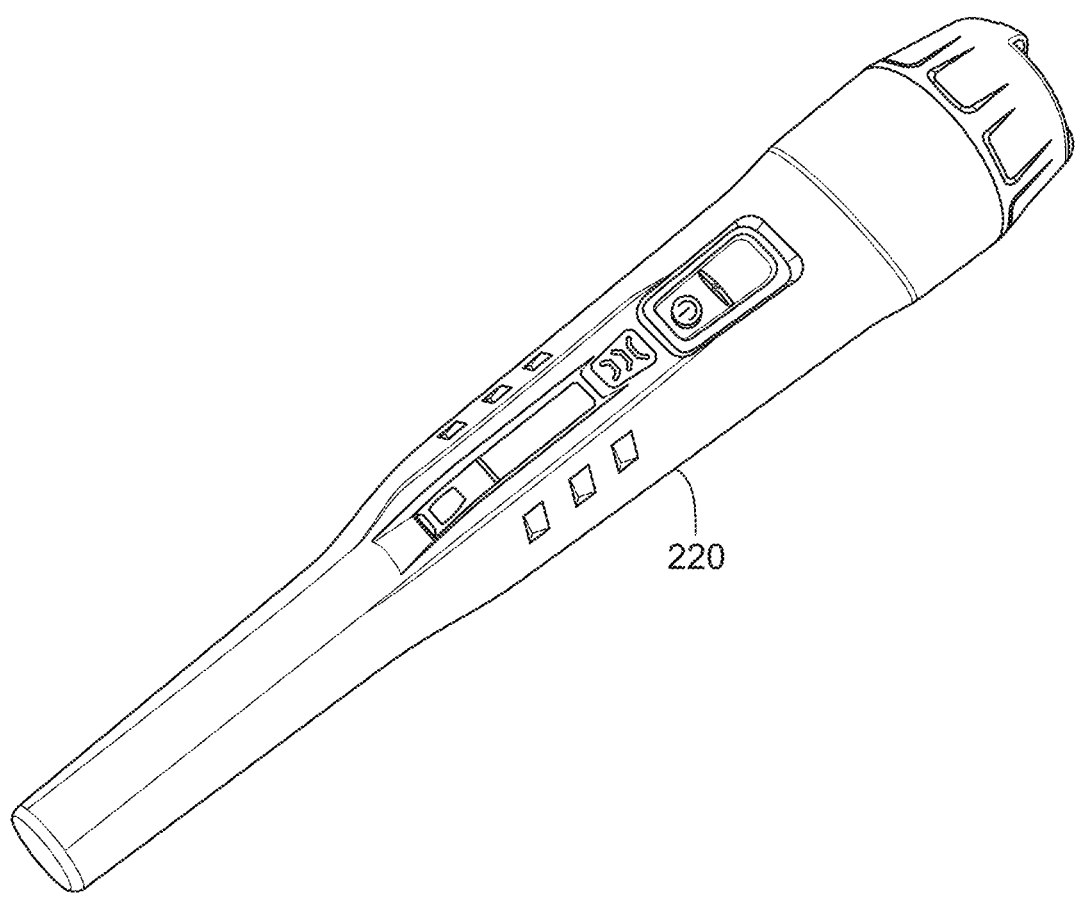
FIG. 6 is an image of a pinpointing probe.

FIG. 6 is an image of a pinpointing probe 220. The pinpointing probe 220 includes at least one transmitter coil, at least one receiver coil, and a communication module. The communication module can use, e.g., Bluetooth or Wi-Fi protocol to communicate with the control module 116 (FIG. 2). In some implementations, the communication module of the pinpointing probe 220 can also communicate with the portable computing device 108 (FIG. 2).

In some implementations, the metal detection program enables the user 90 to create an account and have information related to the metal detection activities be associated with the user account. The following describes examples of interfaces provided by the metal detection program to enable the user 90 to access the various functions provided by the metal detection system 100. The interfaces can vary depending on the functions provided by the system.

Figure 7:
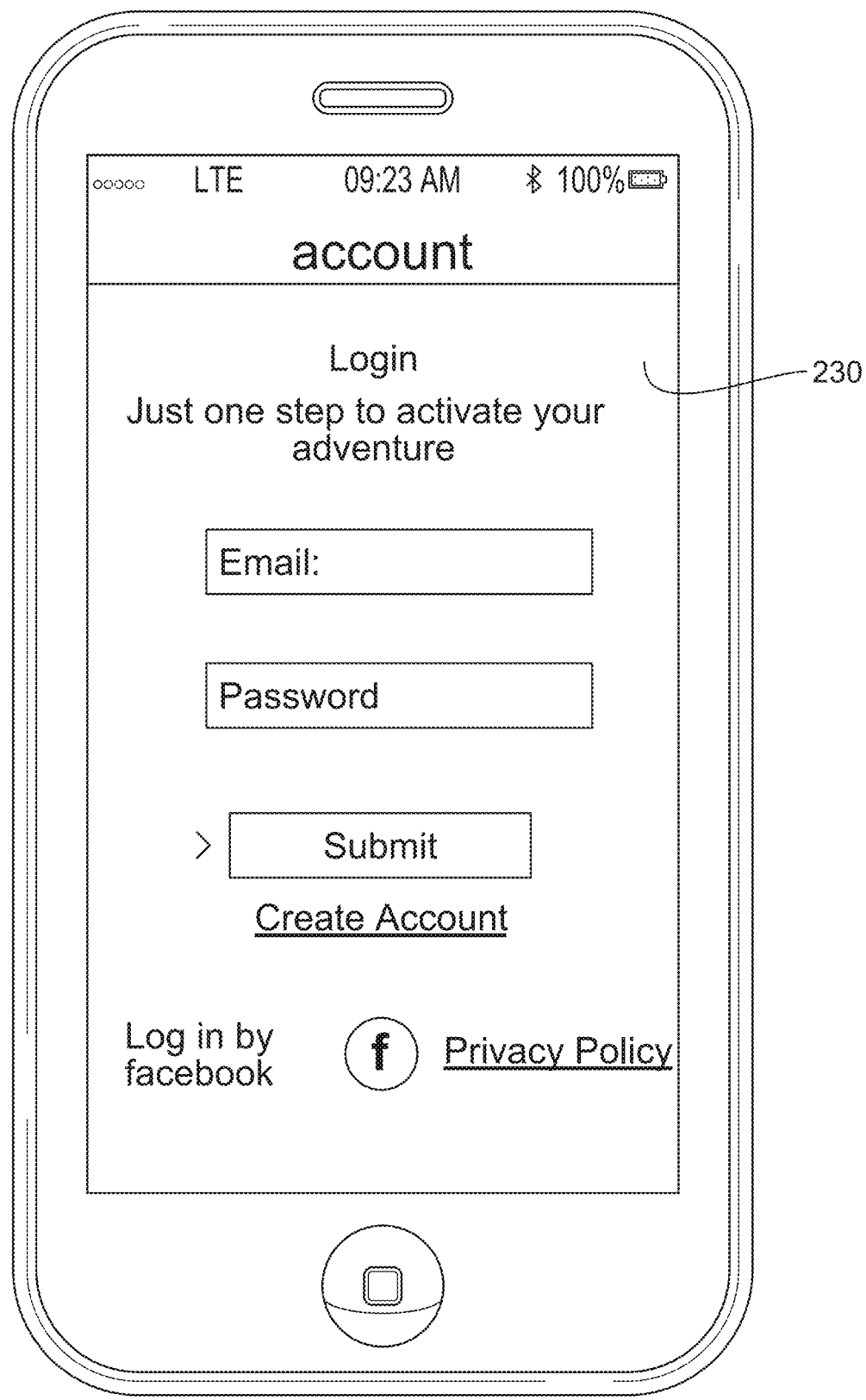
FIGS. 7-18 are screenshots.

FIG. 7 is a screenshot of an exemplary user interface 230 that includes a login screen to allow the user 90 to log in to the user's account or create a new account.

Figure 8:
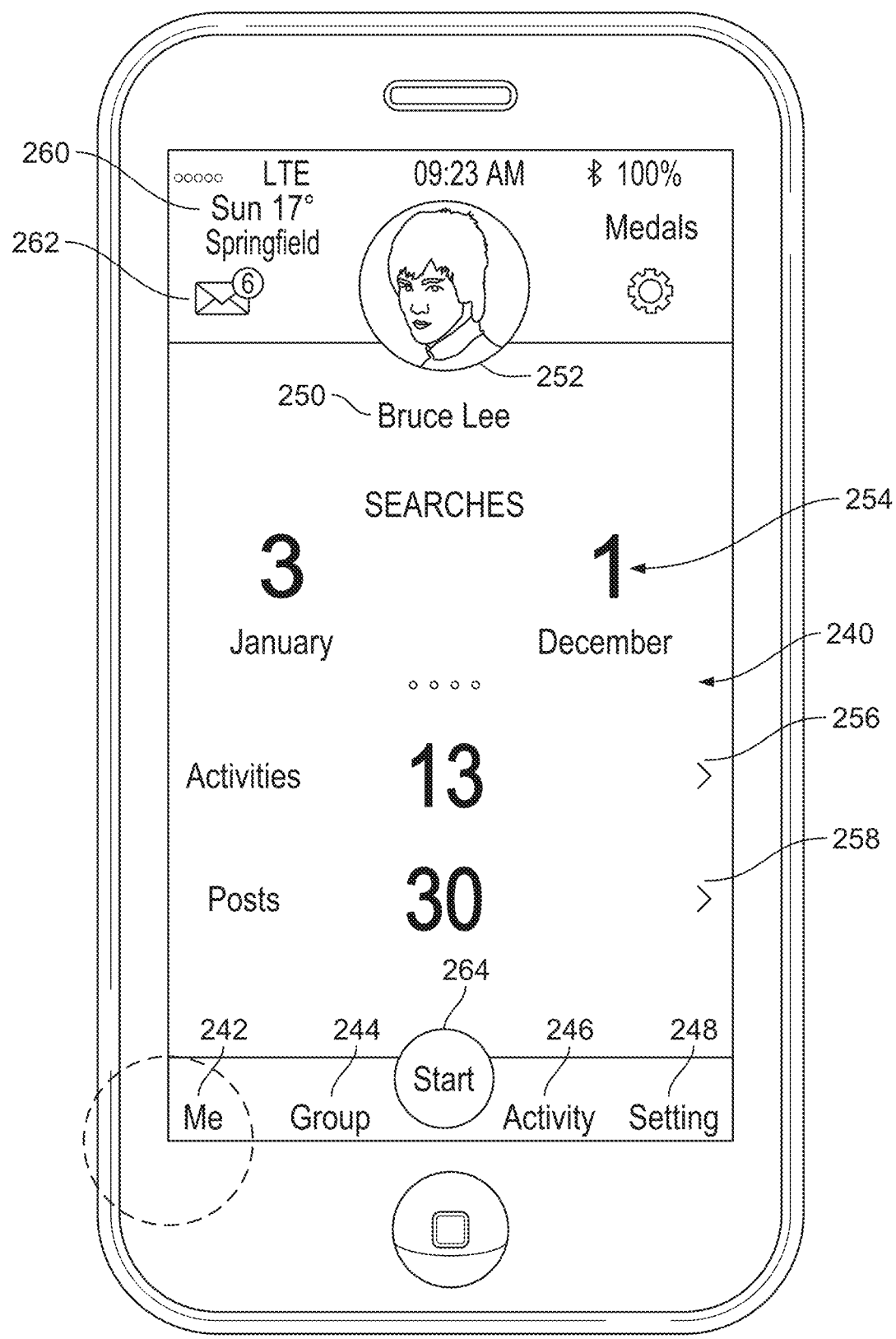

FIG. 8 is a screenshot of an exemplary user interface 240 that is provided to the user 90 after the user logs into the user's account. In this example, the bottom of the interface 240 shows a menu having five selection options: "Me" option 242, "Group" option 244, "Activity" option 246, "Setting" option 248, and "Start" option 264. The "Me" option 242 allows the user 90 to view information about the user's metal detection activities. The "Group" option 244 allows the user 90 to view information about metal detection activities of a user group. The "Activity" option 246 allows the user 90 to view statistics related to the metal detection activities. The "Setting" option 248 allows the user 90 to view and change the settings related to the user account. When the user 90 is ready to perform metal detection activities, the user 90 can select the "Start" option 264, which causes another interface to be shown to the user 90 to provide more options related to metal detection activities.

When the user 90 first logs into the user's account, the "Me" interface 240 having information related to the user 90 is provided on the display. For example, the interface 240 can show a user identifier (ID) 250, a user photo 252, the number of searches 254, the number of activities 256, and the number of posts 258. In this example, the user conducted 1 search in December and 3 searches in January. The user 90 has 13 activities and 30 posts. The interface can also show information about the weather 260 and information about new messages 262.

Figure 9:
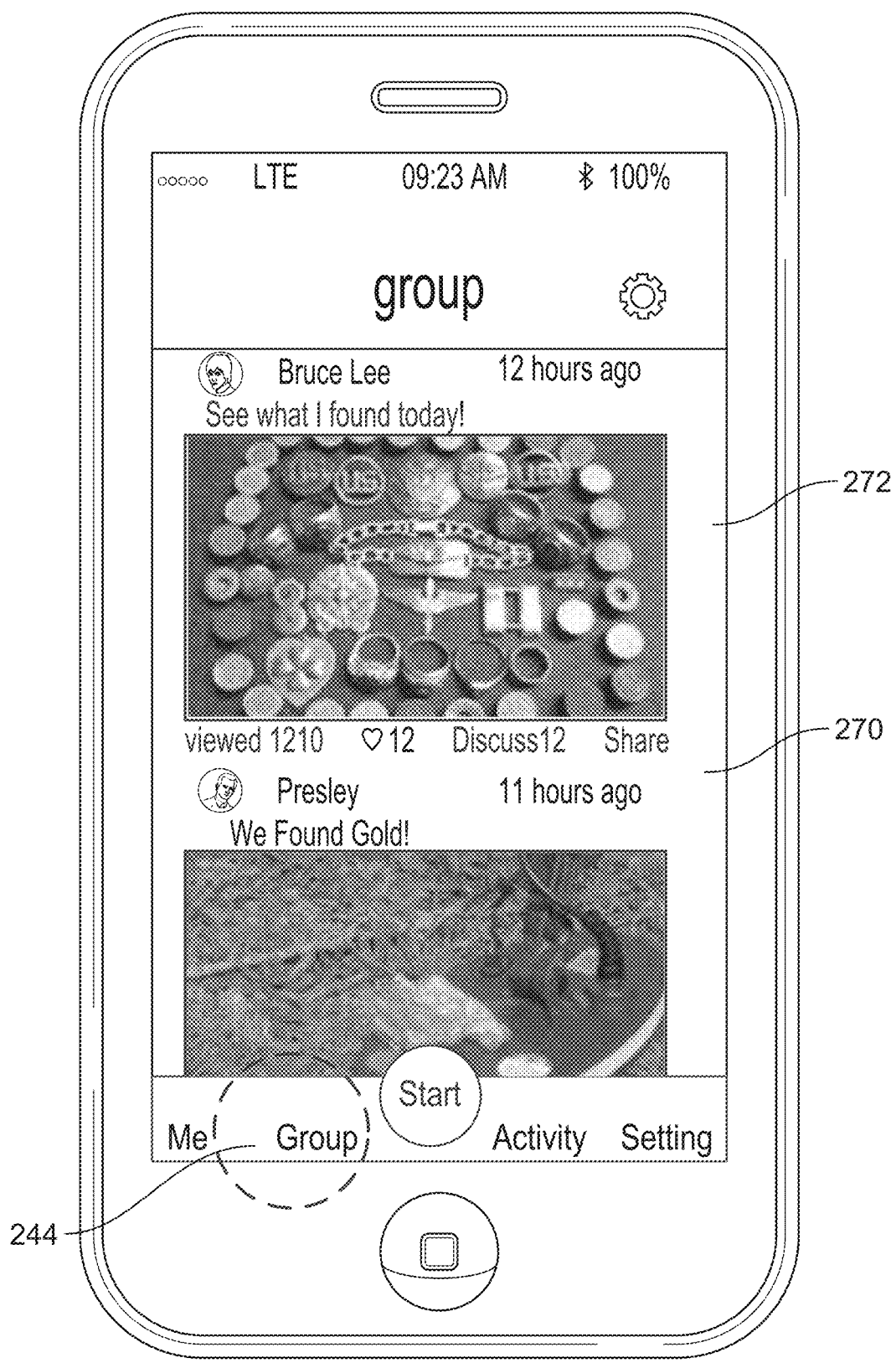

FIG. 9 is a screenshot of an exemplary user interface 270 that is provided to the user 90 when the user selects the "Group" option 244. The "Group" interface 270 can show messages posted by the user 90 and other users. For example, the messages can include photos of the metal objects that were found by the users and text related to the metal detection activities.

Figure 10A:
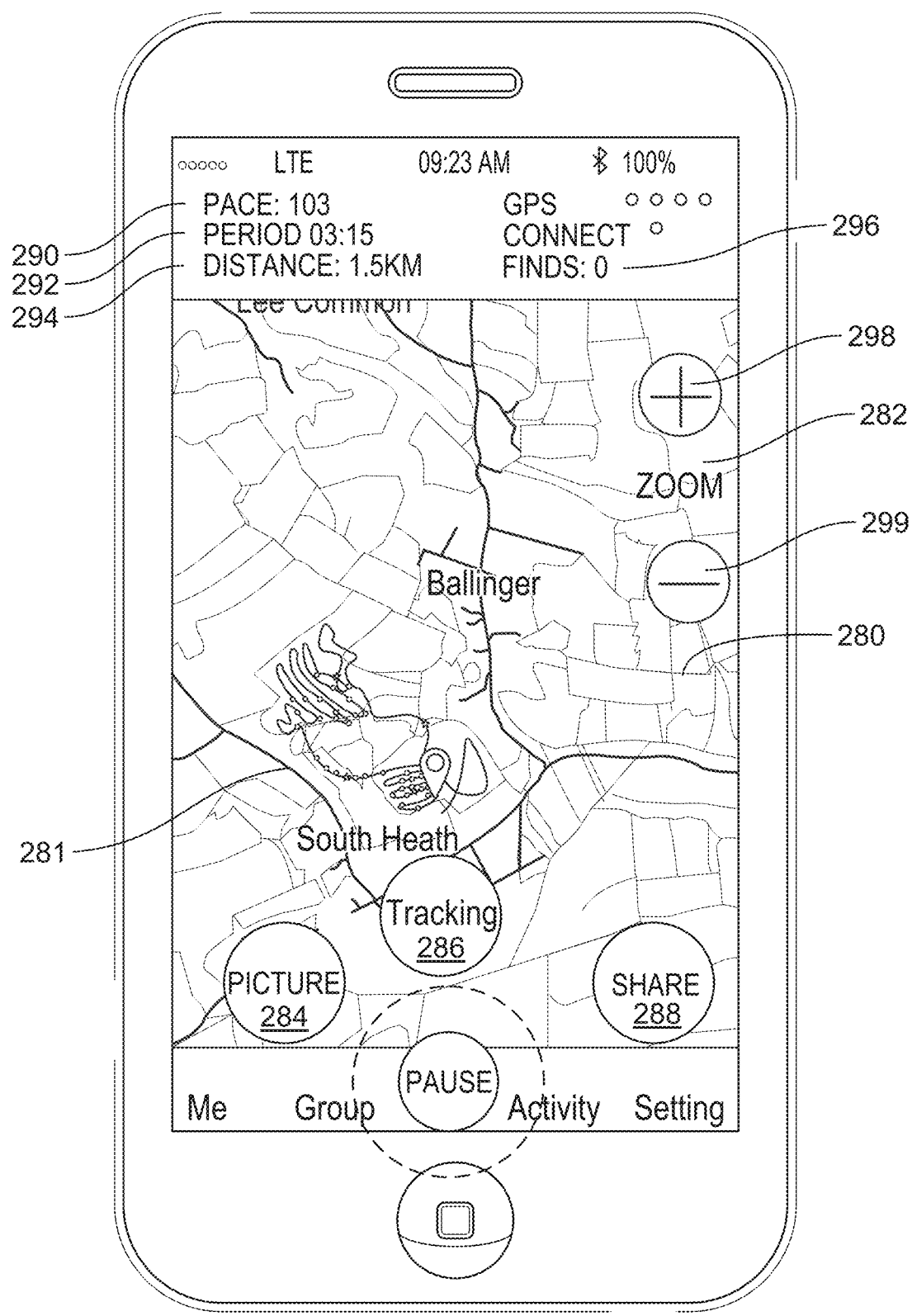

FIG. 10A shows a screenshot of an exemplary user interface 280 that is provided to the user 90 when the user selects the "Start" option 264. The interface 280 includes several options related to the metal detection activities. The metal detection program can connect to the cloud server 136 or a mapping service and download a map or an aerial image 282 of the region where the user 90 is located, and show the map or the aerial image 282 on the display of the portable computing device 108. The interface 280 allows the user 90 to zoom in (e.g., using interactive object 298) or zoom out (e.g., using interactive object 299) of the map or aerial image.

In this example, the interface 280 includes a "Picture" interactive object 284 that when selected allows the user 90 to take a picture. The interface 280 includes a "Tracking" interactive object 286 that when selected causes the metal detection program to start tracking the user's metal detection activities. For example, the metal detection program can start tracking the location of the user 90 (e.g., using the GPS module of the computing device 108), analyze the signals sent from the control module 116, and record events such as findings of metal objects. The interface 280 can show the pace 290 of the user, the period of time 292 since the start of the metal detection activity, the distance 294 that the user 90 has traveled since the start of the metal detection activity, and the number of finds 296 during the metal detection activity. For example, the user can specify the criteria for when the count number for the number of finds 296 is increased, such as when certain types of metal objects are found, or when the detection signal is greater than a certain level. This way, detection of small metal objects such as pull tabs will not affect the count number, and the number of finds 296 can represent the number of significant metal objects that have been found.

The interface 280 includes a "Share" interactive object 288 that when selected allows the user 90 to share information about the user's metal detection activities with others, such as through social media or by posting messages to a message board maintained by the cloud server 136.

Figure 10B:
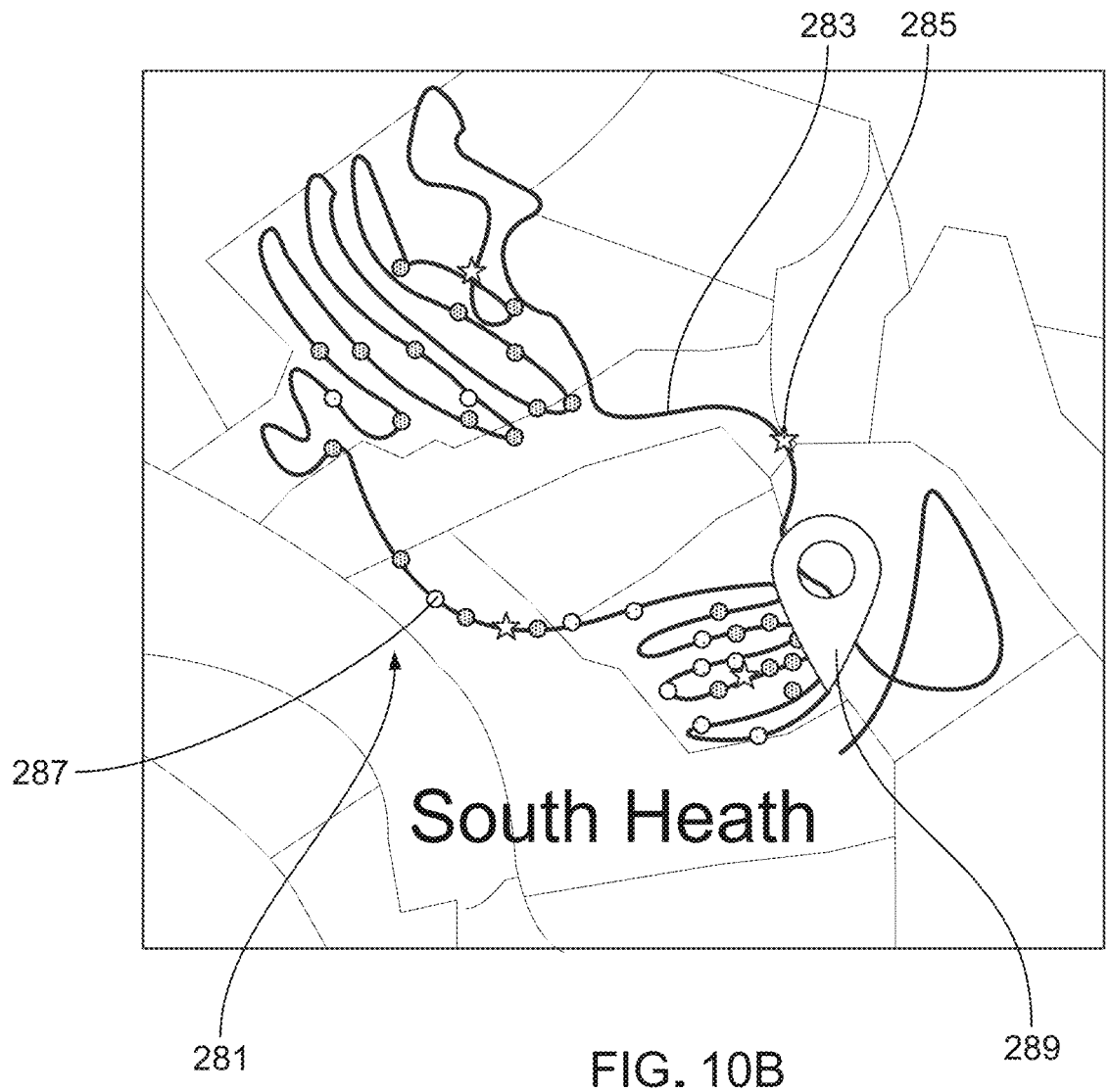

FIG. 10B shows an enlarged view of a portion 281 of the screenshot of FIG. 10A. In this example, overlaid on the map is a marker 289 showing the user's current location, a trail 283 representing the path that the user has explored, and markers (e.g., 285 and 287) showing locations where metal objects have been found. The markers can have different shapes, sizes, and color to represent different characteristics of the metal objects that were detected, such as the types and/or depths of the metal objects. Other information can also be overlaid on the map.

Figure 11:
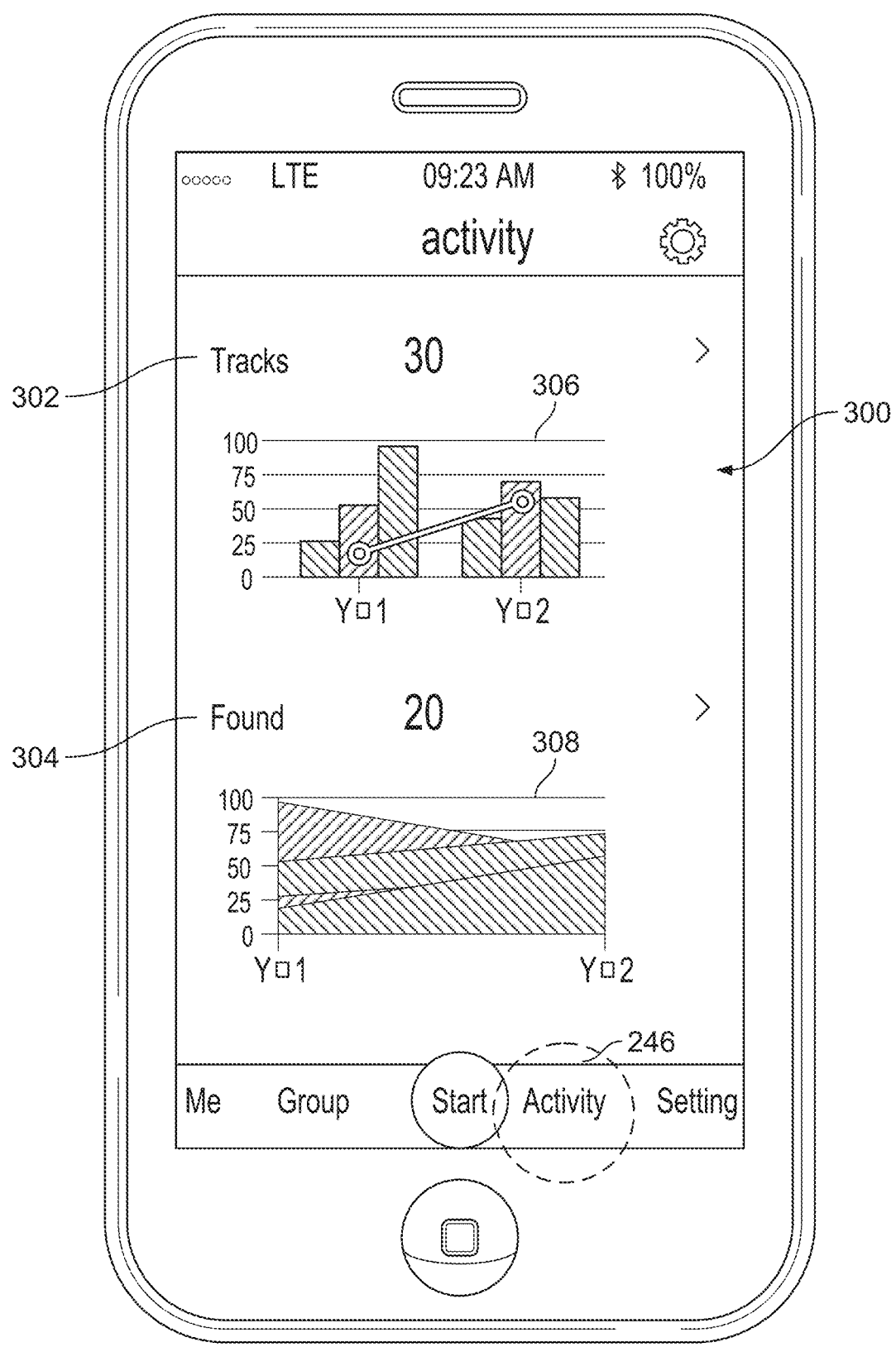

FIG. 11 is a screenshot of an exemplary user interface 300 that is provided to the user 90 when the user selects the "Activity" option 246. The interface 300 shows statistics related to the user's metal detection activities. For example, the interface 300 shows the number of tracks 302 associated with the user 90, and the number of finds 304 associated with the user. In this example, the user 90 has activated the tracking function (e.g., by selecting the "Start" 264 interactive object) 30 times. For example, the interface 300 can show a graph 306 that includes information about how many tracking events occurred for each quarter of each year (or other intervals selected by the user 90). In this example, the user 90 has found 20 metal objects (or 20 metal objects that meet the criteria specified by the user). For example, the interface 300 can show a graph 308 that includes information about how many metal objects were found by the user over a period of time.

Figure 12:
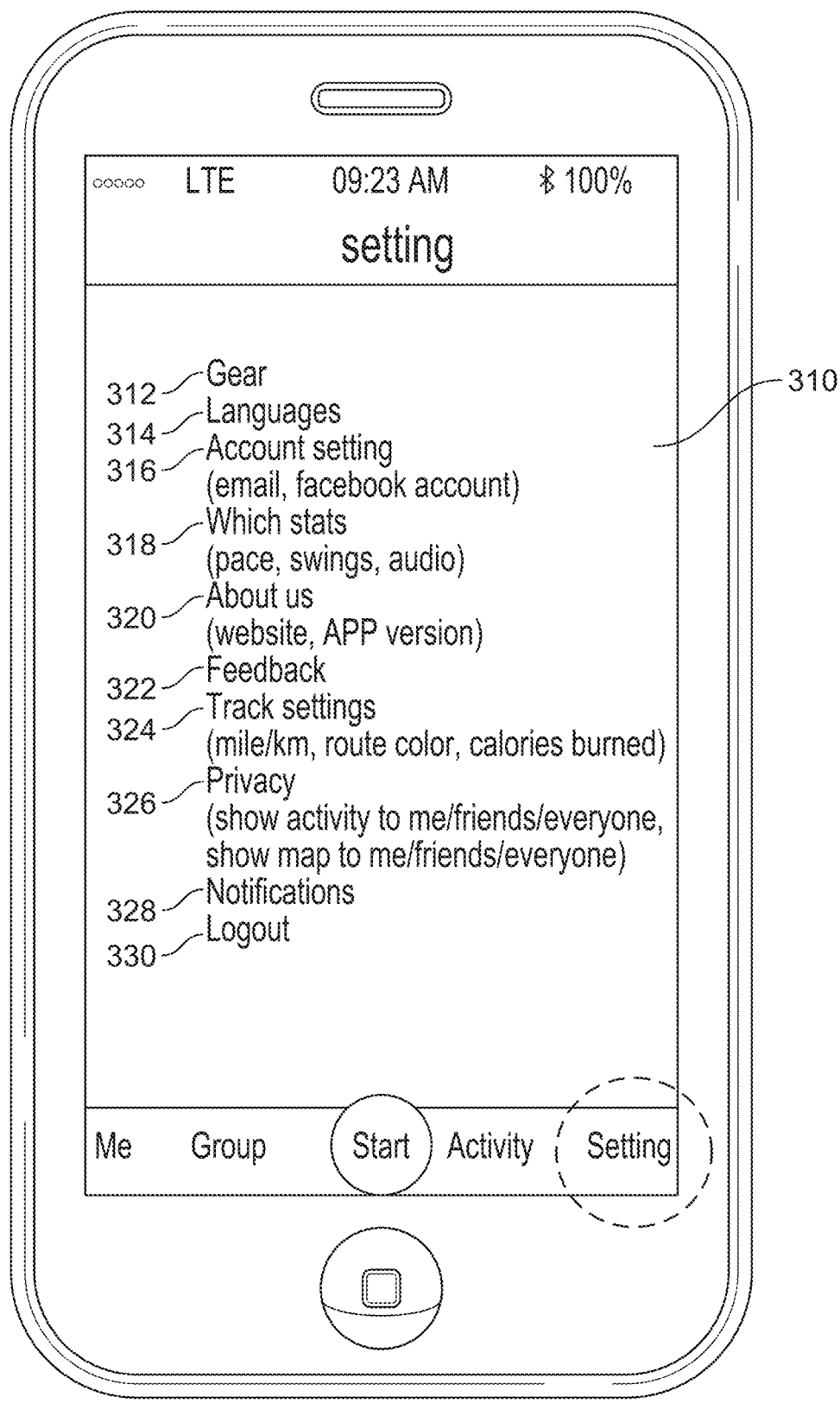

FIG. 12 shows a screenshot of an exemplary user interface 310 that allows the user 90 to view and change the settings of the metal detection program. For example, the interface 310 can include a "Gear" option 312 that allows the user to manage information about the metal detection gears associated with the user account. A "Languages" option 314 allows the user 90 to select the language used by the interfaces of the metal detection program. An "Account setting" option 316 allows the user 90 to view and/or change the settings of various accounts, such as e-mail and social media accounts. A "Which stats" option 318 allows the user 90 to configure various statistics, such as those related to the user's pace and swings. An "About us" option 320 allows the user 90 to view information about the metal detection program, including information about the website of the company that developed the metal detection program, and the version number of the metal detection program.

A "Feedback" option 322 allows the user 90 to provide feedback to the developer of the metal detection program. A "Track settings" option 324 allows the user 90 to view and/or adjust the settings related to tracking the movements of the user, such as selecting whether to show the distance in miles or kilometers, and selecting the color for showing the routes of the user 90 on the map. A "Privacy" option 326 allows the user 90 to view and/or adjust the privacy settings, such as whether to show the metal detection activities to the user only, to the user's friends, or to everyone, and whether to show the maps related to the metal detection activity to the user only, to the user's friends, or to everyone. A "Notifications" option 328 allows the user 90 to view and/or adjust the settings related to notifications, such as the types of notifications that the user 90 wishes to receive, and what kinds of visual and audio alerts should be shown for the notifications. A "Logout" option 330 allows the user to view and/or adjust the settings related to what happens when the user logs out of the user account, such as whether certain events are still being tracked in the background.

Figure 13:
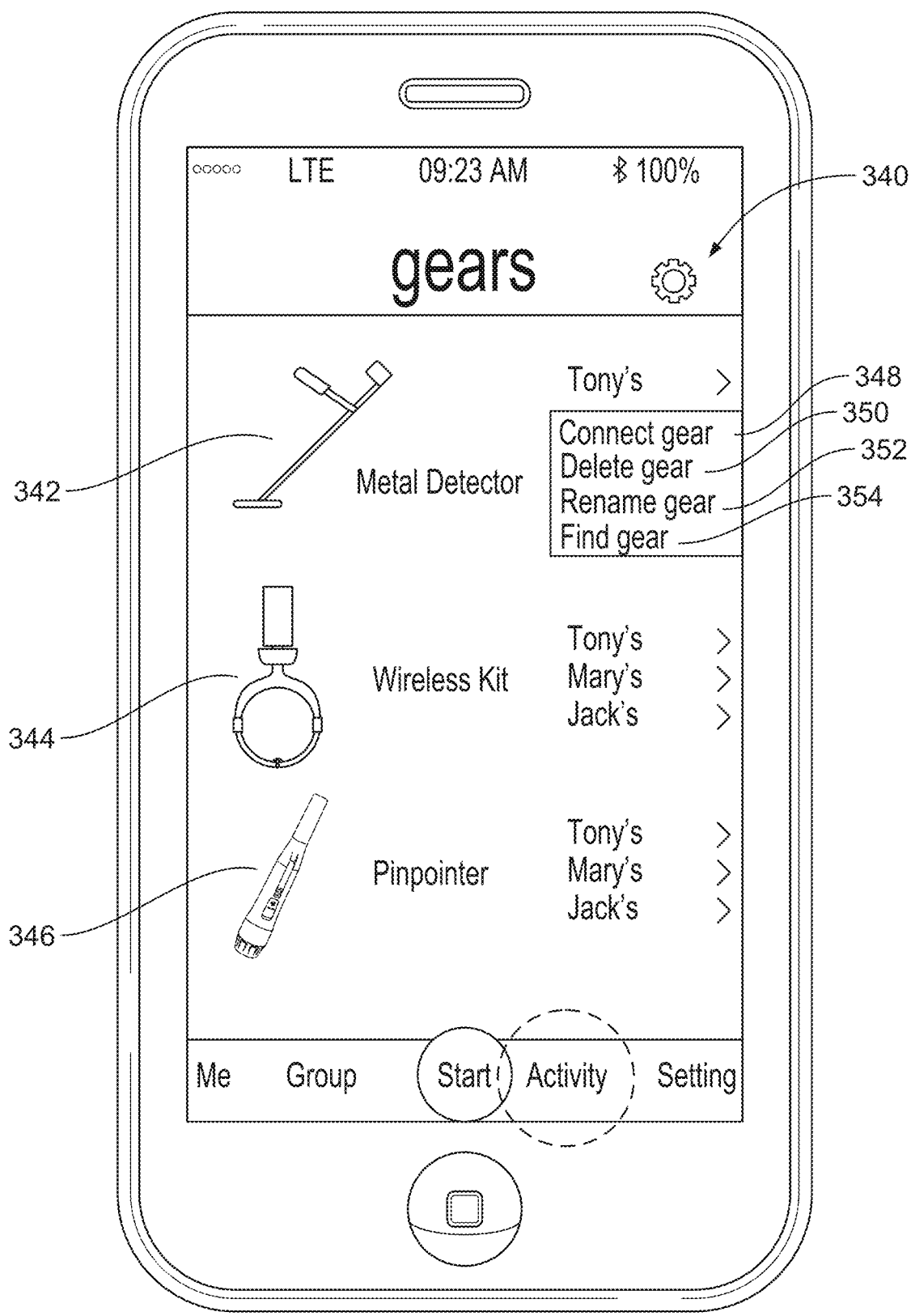

FIG. 13 is a screenshot of an exemplary interface 340 that allows the user 90 to manage gears associated to the metal detection activities. For example, the gears can be managed according to category. The interface 340 lists an inventory of the gears that are being managed by the metal detection program. In this example, there are three types of gears: metal detectors 342, wireless kits 344, and pinpointing probes 346. In this example, there is one metal detector that belongs to Tony. When the user 90 selects Tony's metal detector, the interface 340 provides several options related to management of the gear.

A "Connect gear" option 348 allows the user 90 to connect wirelessly to the gear. A "Delete gear" option 350 allows the user 90 to delete the gear from the inventory list. A "Rename gear" option 352 allows the user 90 to rename the gear. A "Find gear" option 354 when selected invokes functions that can assist the user 90 in finding the gear. In this example, there are three wireless kits that belong to Tony, Mary, and Jack. There are three pinpointing probes that belong to Tony, Mary, and Jack.

Figure 14:
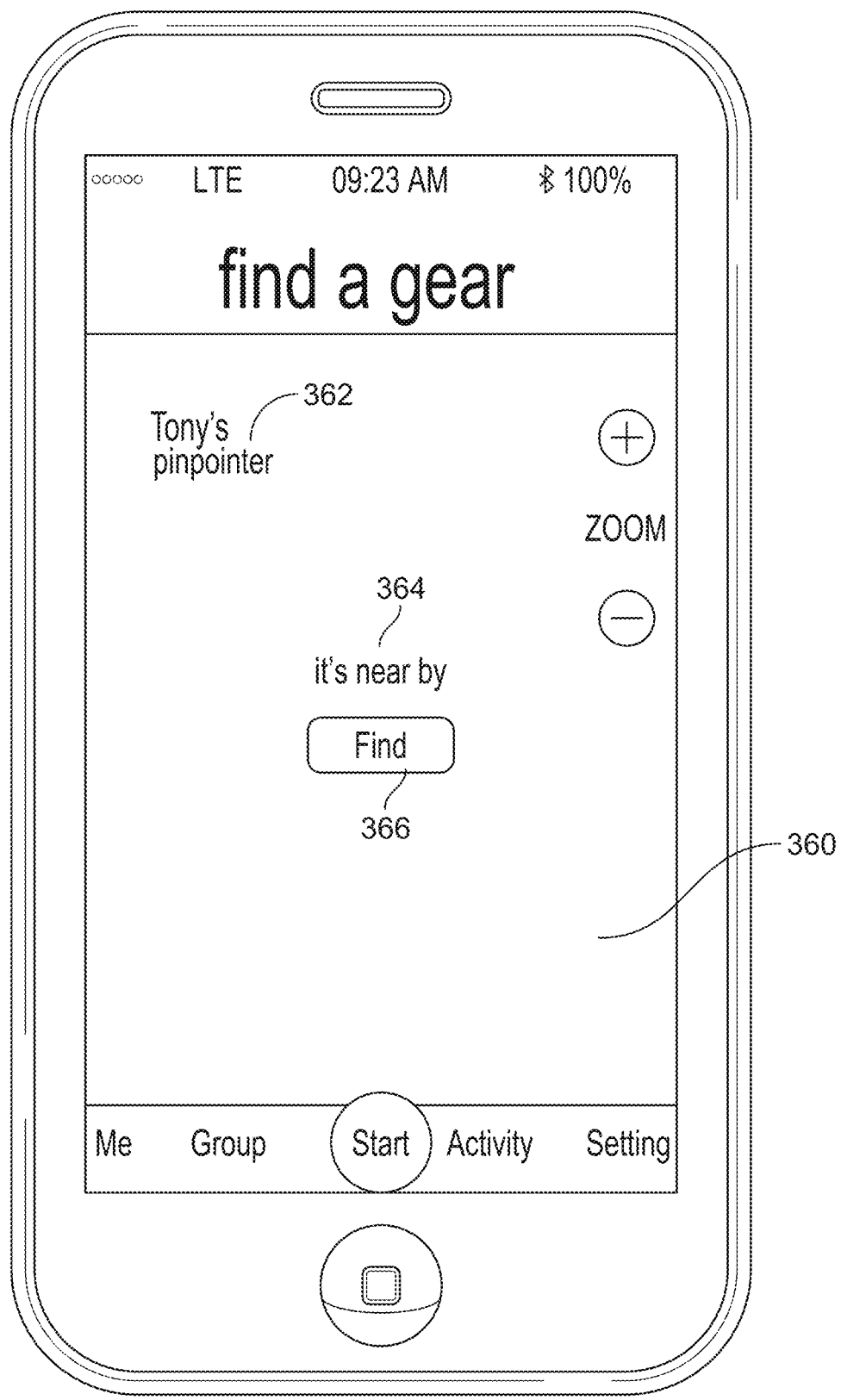

FIG. 14 is screenshot of an exemplary user interface 360 that provides functions to assist the user 90 in finding a gear. For example, the user 90 may carry several different metal detectors and probes having different detection capabilities and characteristics on an exploration trip. Each metal detector or probe may be particularly sensitive to a particular type of metal object in a particular environment. The user may accidentally leave one or more gears in the field and not know where the gears are. Sometimes the gears may be placed in various locations in the house and/or garage and the user 90 may not remember where the gears are.

In this example, the user 90 selected the "Find gear" option to find Tony's pinpointing probe 362. In some implementations, the gears, such as the metal detectors, the wireless kits, and the pinpointing probes communicate with the portable computing device 108 using Bluetooth or Wi-Fi, so the portable computing device 108 can detect the wireless signals transmitted by the gears to determine whether the gears are nearby. The metal detection program can also record the last known location of the gear based on the location of the computing device 108 right before the gear disconnected from the computing device 108.

In some implementations, the gear when placed in standby mode does not emit wireless signals, but will periodically listen to signals indicating that the computing device 108 is attempting to connect with the gear. When the gear receives such a signal, the gear wakes up from standby mode and transmits signals to attempt to establish a connection with the computing device 108.

In this example, the computing device 108 shows a message 364 indicating that Tony's pinpointing probe is possibly near the user's location. A "Find" option 366 interactive object allows the user 90 to use the tools provided by the computing device 108 to assist in finding Tony's pinpointing probe.

Figure 15:
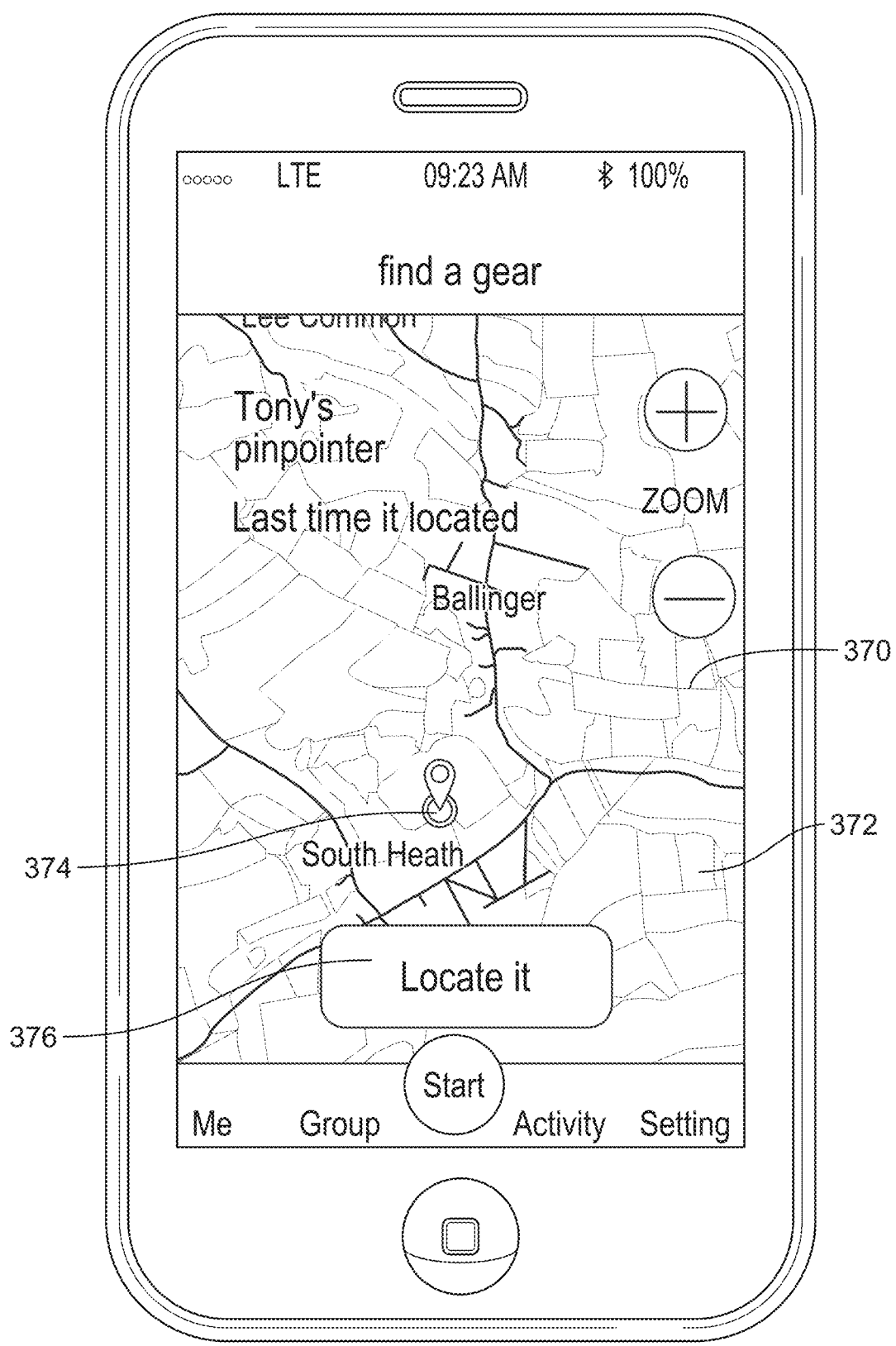

FIG. 15 is a screenshot of an exemplary user interface 370 that can assist the user 90 in finding a gear, which in this example is Tony's pinpointing probe. After the user 90 selects the "Find" option 366 in the interface 360 of FIG. 14, the interface 370 shows a map 372 on which is overlaid a marker 374 showing the last known location of Tony's pinpointing probe. A "Locate it" interactive object 376 when selected causes the computing device 108 to attempt to re-connect with the gear. In some examples, the gear itself can have a GPS module and can provide its coordinates. Based on the coordinates provided by the gear, the interface 370 shows the location of the gear on the map. In some examples, the gear can have a beeper or speaker, and the metal detection program can cause the beeper or speaker of the gear to emit a sound to assist the user 90 in finding the gear. In some examples, the computing device 108 has a directional antenna that can determine the direction of the signal transmitted by the gear. The interface 370 can then show the direction of the gear on the map and guide the user 90 toward the gear. In some examples, the computing device 108 can show the user 90 the strength of the signal transmitted by the gear, and the user can search for the gear by moving toward the direction where the signal is strongest.

Figure 16:
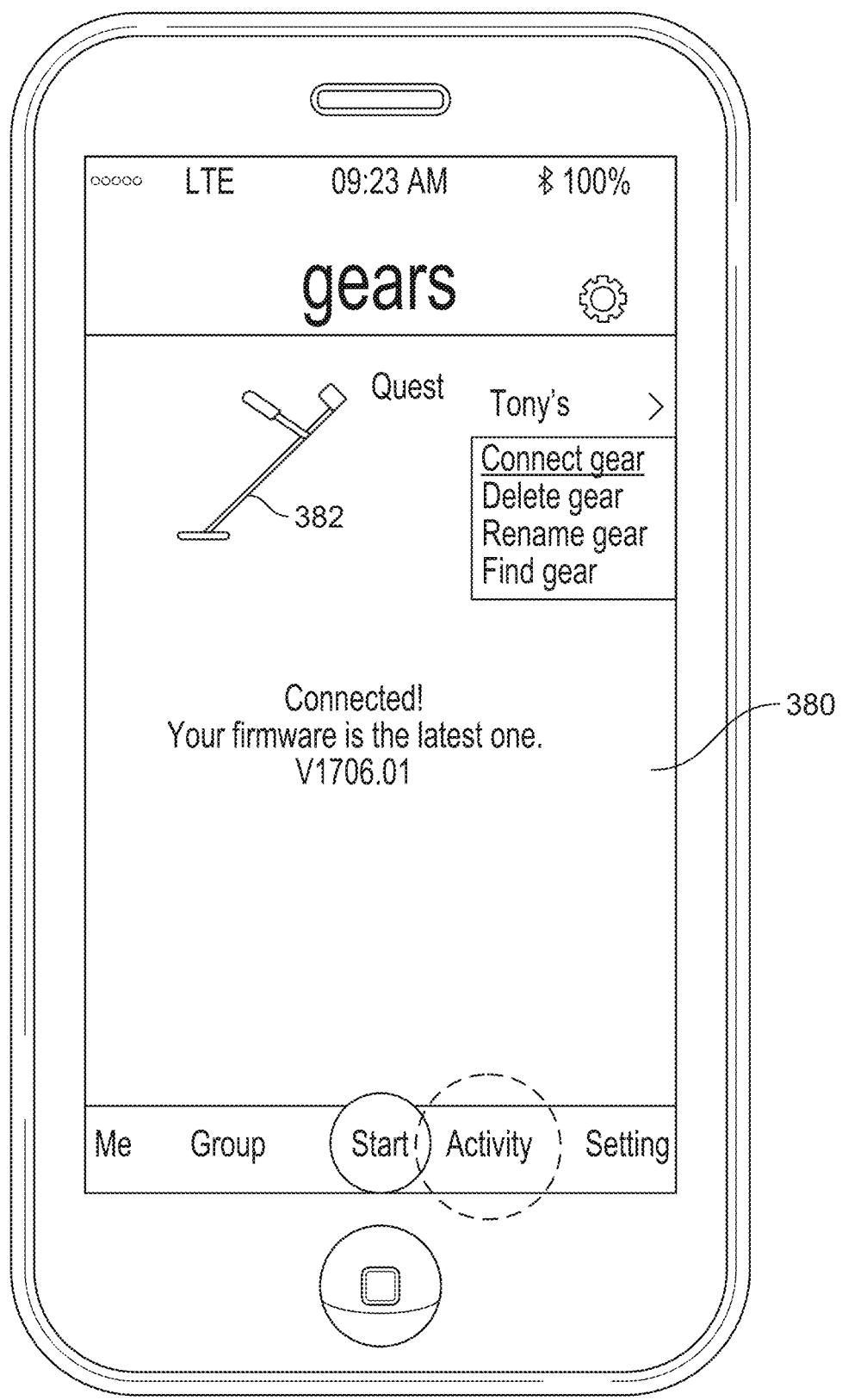

FIG. 16 shows a screenshot of an exemplary user interface 380 that is provided to the user 90 when the user wirelessly connects a gear with the computing device 108. In this example, the user 90 connects Tony's metal detection device 382 named 'Quest' with the computing device 108, allowing the metal detection program to obtain information about the metal detection device 382. For example, the metal detection program can ask the gear to provide the firmware version number. In this example, the metal detection program determines that Tony's metal detector has the latest firmware.

Figure 17:
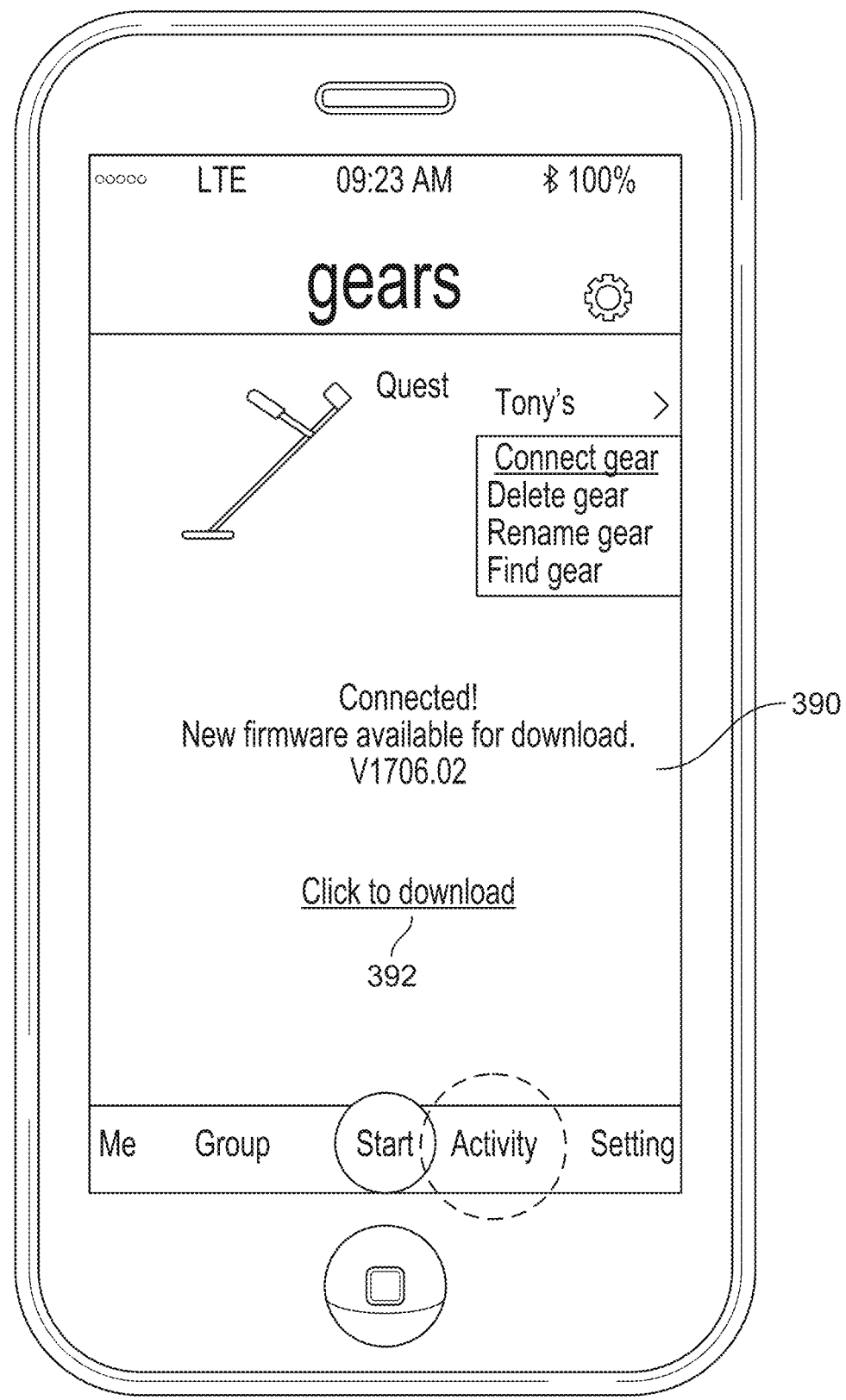

FIG. 17 shows a screenshot of an exemplary user interface 390 that is provided to the user 90 when the user connects a gear with the computing device 108 and determines that the firmware of the gear needs updating. A "Click to download" link 392 is provided to allow the user 90 to download the new firmware.

Figure 18:
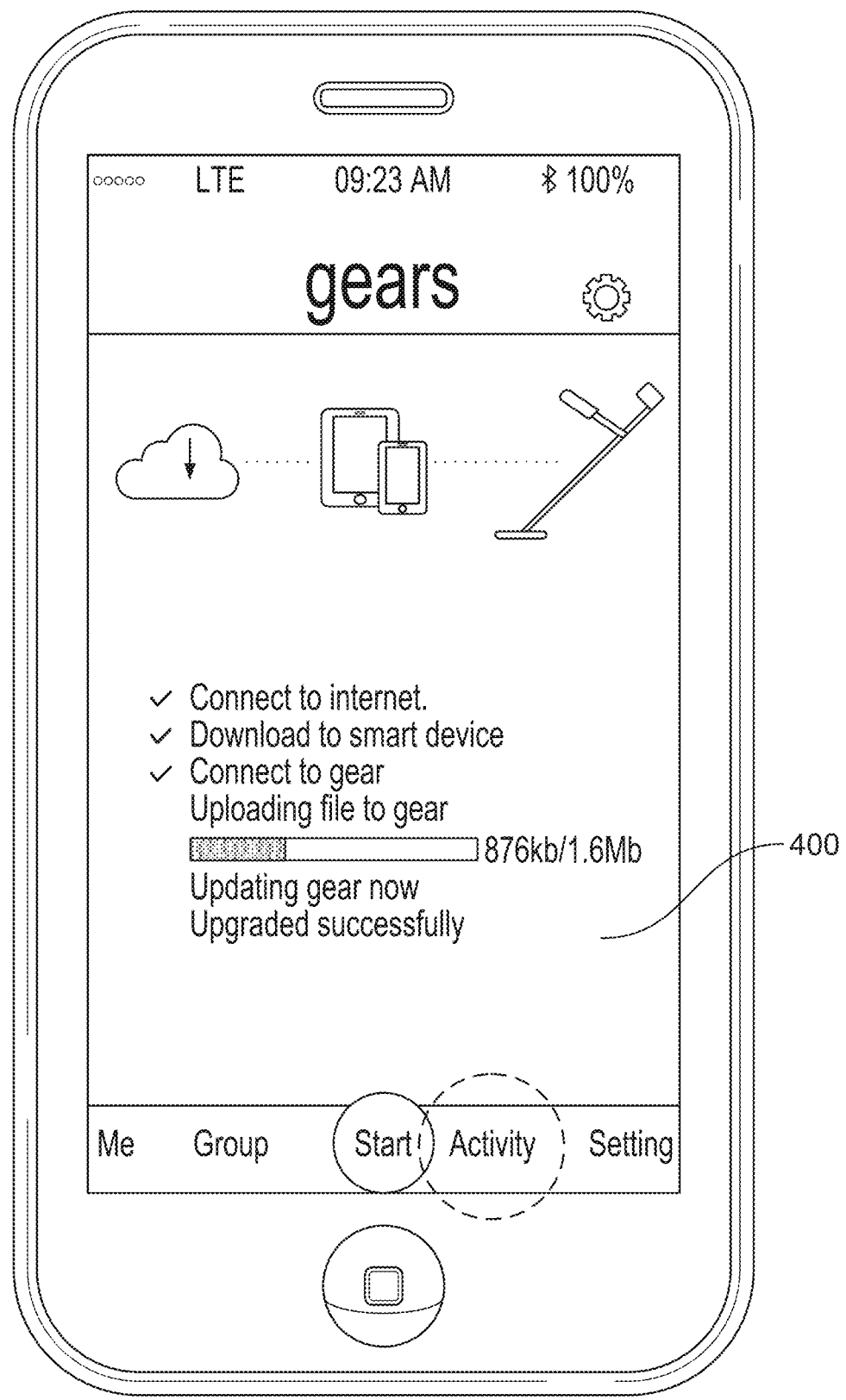

FIG. 18 is a screenshot of an exemplary user interface 400 that is provided to the user 90 to show the progress of downloading the firmware and updating the gear with the new firmware.

Figure 19:
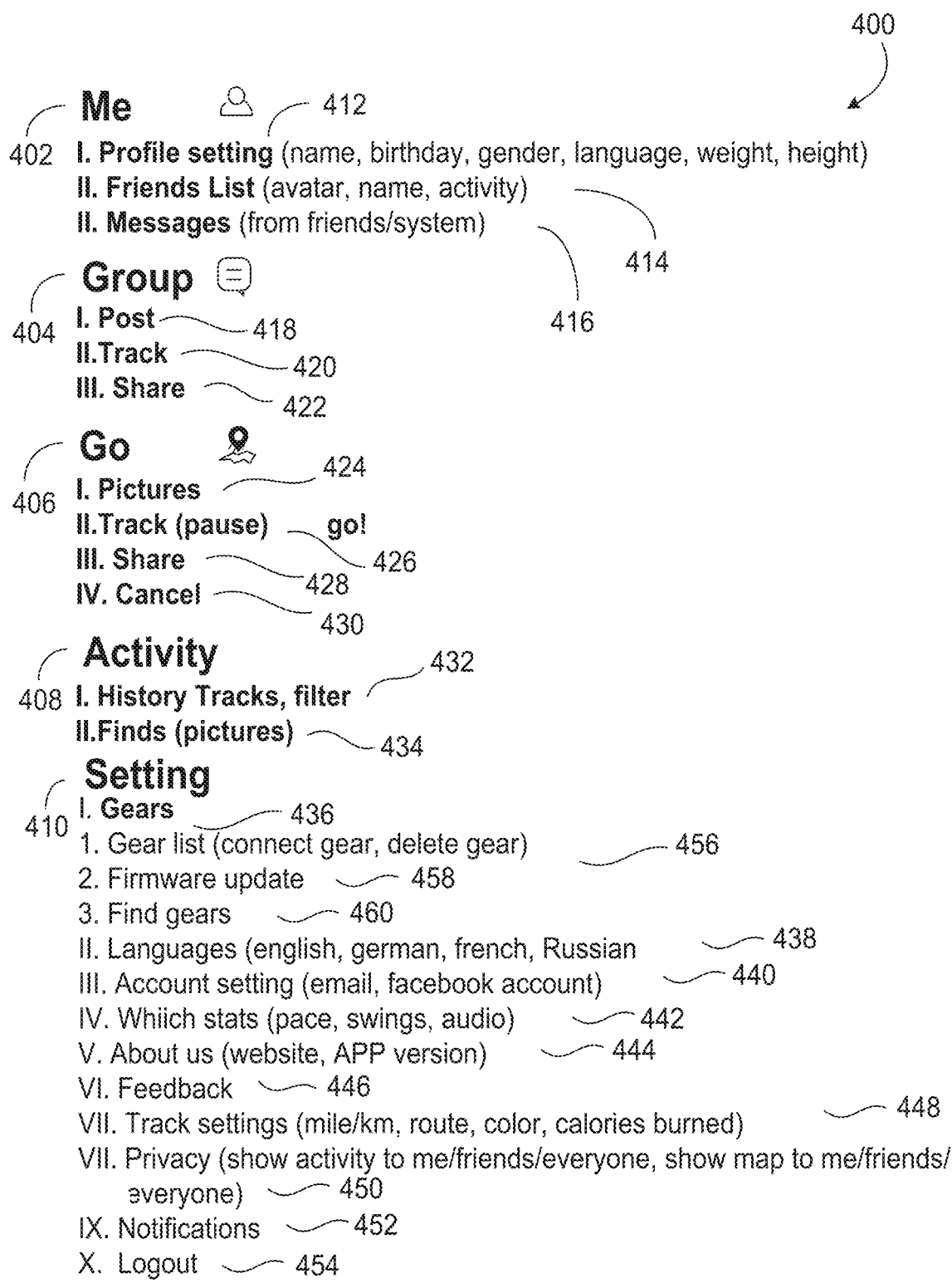
FIG. 19 shows a list of menu options.

FIG. 19 shows an exemplary list 400 of the menu options and functions provided by the metal detection program. A top level menu provides options such as a "Me" option 402, a "Group" option 404, a "Go" option 406, an "Activity" option 408, and a "Setting" option 410. When the "Me" option 402 is selected, additional menu options such as "Profile setting" 412, "Friends List" 414, and "Messages" 416 are provided. The "Profile setting" option 412 allows the user 90 to enter information about the user's profile, such as name, birthday, gender, language preference, weight, and height. The "Friends List" option 414 allows the user 90 to enter information about friends, such as their avatars, names, and activities. The "Messages" option 416 allows the user 90 to manage messages from friends and the system.

When the "Group" option 404 is selected, additional menu options such as "Post" 418, "Events" 420, and "News" 422 are provided. The "Post" option 418 allows the user 90 to post a message or photo to the metal detection program or a web site, such as a social media web site, and share information with a group of users. The "Events" option 420 allows the user 90 to view various events related to the group of users, such as meetings and gatherings of the users. The "News" option 422 allows the user 90 to view news related to the group of users, such as new messages posted by the group of users.

When the "Go" option 406 is selected, additional menu options such as "Pictures" 424, "Track" 426, "Share" 428, and "Cancel" 430 are provided. The "Pictures" option 424 allows the user 90 to take a picture, e.g., of the metal object that was found or the environment where the metal object was found. The "Track" option 426 allows the user to instruct the metal detection program to start tracking the user's metal detection activities. The "Share" option 428 allows the user 90 to share information about the metal detection activities with the group of users. The "Cancel" option 430 allows the user 90 to instruct the metal detection program to stop tracking the user's metal detection activities.

When the "Activity" option 408 is selected, additional menu options such as "History Tracks" 432 and "Finds" 434 are provided. The "History Tracks" option 432 allows the user 90 to view the history and/or statistics of tracking activities. The "Finds" option 434 allows the user 90 to view information, e.g., statistics and pictures, about the metal objects that have been found by the user 90.

When the "Setting" option 410 is selected, additional menu options such as "Gears" 436, "Languages" 438, "Account setting" 440, "Which stats" 442, "About us" 444, "Feedback" 446, "Track settings" 448, "Privacy" 450, Notifications "452", and "Logout" 454 are provided. When the "Gears" option 436 is selected, additional menu options such as "Gear list" 456, "Firmware update" 458, and "Find gears" 460 are provided. The "Gear list" option 456 allows the user to view a list of gears associated with the user's account. The "Firmware update" option 458 allows the user 90 to conveniently update the firmware of the gears. The "Find gears" option 460 allows the user 90 to find the gears based on the last known position of the gears, and/or based on the wireless signals emitted by the gears.

The "Languages" option 438 allows the user 90 to select the language used by the interfaces of the metal detection program, such as in English, German, French, or Russian. The "Account setting" option 440 allows the user 90 to view and/or change the settings of various accounts, such as e-mail and social media accounts. The "Which stats" option 442 allows the user 90 to configure various statistics, such as pace and swings. The "About us" option 444 allows the user 90 to view information about the metal detection program, including information about the website of the company that developed the metal detection program, and the version number of the metal detection program.

The "Feedback" option 446 allows the user 90 to provide feedback to the developer of the metal detection program. The "Track settings" option 448 allows the user 90 to view and/or adjust the settings related to tracking the movements of the user 90, such as selecting whether to show the distance in miles or kilometers, and selecting the color for showing the routes of the user 90 on the map. The "Privacy" option 450 allows the user 90 to view and/or adjust the privacy settings, such as whether to show the metal detection activities to the user only, to the user's friends, or to everyone, and whether to show the maps related to the metal detection activity to the user only, to the user's friends, or to everyone. The "Notifications" option 452 allows the user 90 to view and/or adjust the settings related to notifications, such as the types of notifications that the user 90 wishes to receive, and what kinds of visual and audio alerts should be shown for the notifications. The "Logout" option 454 allows the user 90 to view and/or adjust the settings related to what happens when the user logs out of the user account, such as whether certain events are still being tracked in the background, and whether the computing device 108 continues to maintain connection with the gears.

Figure 20:
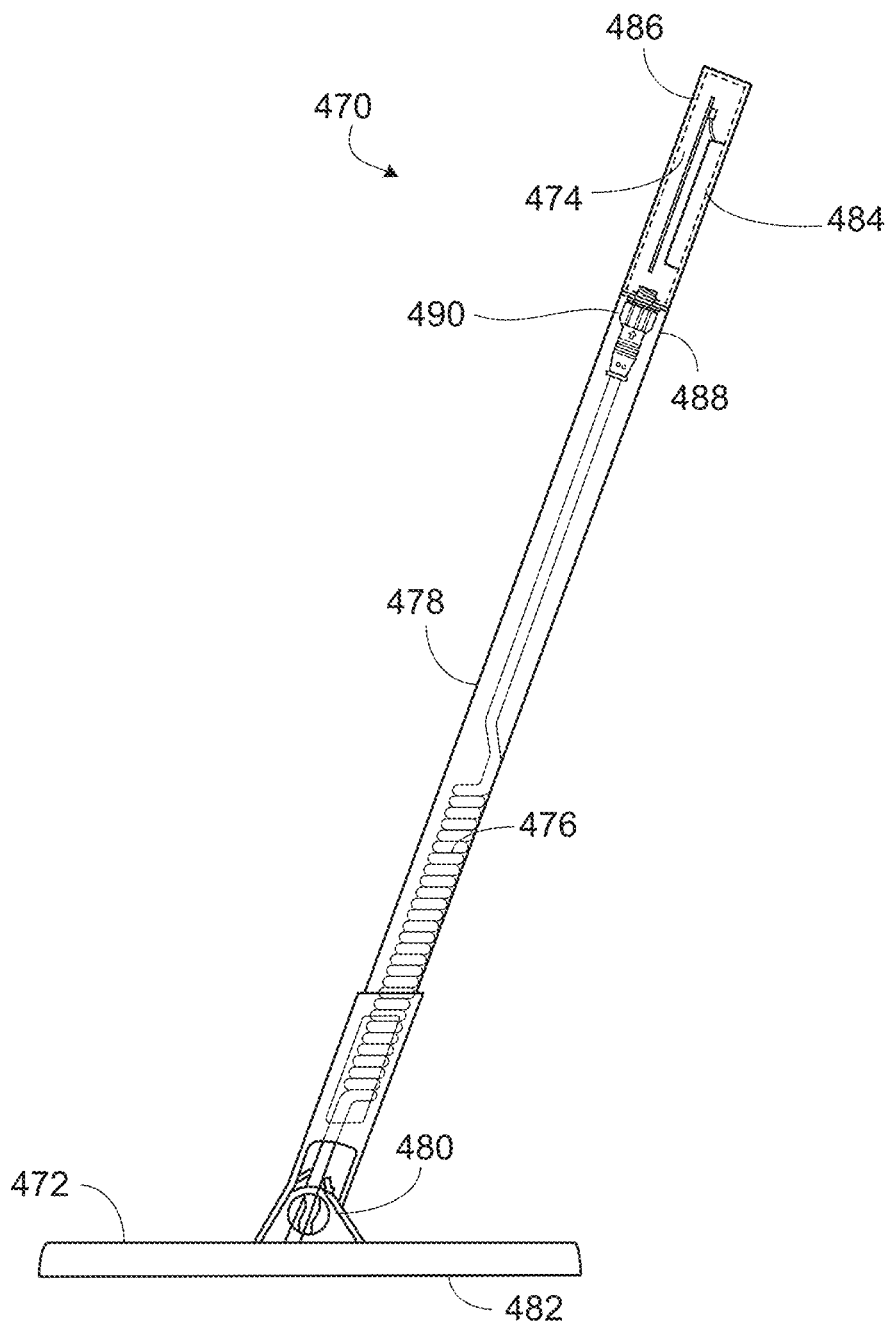
FIG. 20 is a diagram of a metal detection device.

FIG. 20 is a diagram of a metal detection device 470 that includes a rod 478 that is pivotly coupled to a detection module 482 through a tilt joint 480. The detection module 482 includes a detection coil 472 configured to sense electromagnetic signals emitted by underground metal in response to the electromagnetic waves emitted by an electromagnetic wave emitter of the detection module 482. The electromagnetic signals detected by the detection coil 472 are transmitted to a signal processing and wireless module 474 through a connection wire configured as a spring cable 476 that is positioned inside the rod 478. The signal processing and wireless module 474 and a battery 484 are enclosed in a housing 486 that is coupled to an end 488 of the rod 478. The spring cable 476 is coupled to the signal processing and wireless module 474 through a waterproof connector 490.

In some implementations, the signal processing and wireless module 474 processes the electromagnetic signals detected by the detection coil 472 and generates processed signals that are transmitted wirelessly to a control module, such as the control module 116 of FIG. 2 or the control module 152 of FIG. 3. This allows the control module 152 to be placed at a location that is convenient to the user 90. For example, sometimes the user 90 may prefer to listen to audio signals through headphones in which the audio signals provide information on whether metal objects have been detected and what type of metal objects have been detected. The user 90 can place the control module 152 in a backpack, a handbag, or a pocket. The metal detection device 470 can be made lighter and more compact compared to the metal detection device 150 (FIG. 3). The user 90 can take the control module 152 out of the backpack, the handbag, or the pocket when the user 90 needs to view the information on the display module 154 or enter commands through the keypad 156.

In some implementations, the signal processing and wireless module 474 processes the electromagnetic signals detected by the detection coil 472 and generates processed signals that are transmitted wirelessly to the portable computing device 108, which can be, e.g., a mobile phone, a smart watch, or smart eyeglasses. In this example, the control module 116 can be integrated into the signal processing and wireless module 474, so that there is no need for a separate housing 170, display module 154, and keypad 156. The user 90 can view information using the display of the portable computing device 108, and enter commands using the keypad, touchpad, or touchscreen of the portable computing device 108. This allows the metal detection device 470 to be made at a lower cost as compared to the metal detection device 150 (FIG. 3).

In some implementations, a vehicle, such as a remote controlled car, equipped with a detection module that can detect underground metal objects, can be controlled by the computing device 108 to explore a region that has been selected by the user 90. The vehicle includes a positioning module, such as a GPS module, to allow the computing device 108 to track the position of the vehicle. The detection module can be mounted on the underside of the vehicle, and the vehicle can include a control module for processing the electromagnetic signals detected by the detection module. When the vehicle detection module picks up a signal that resembles those emitted by an underground metal object, the control module sends a signal to the computing device 108.

The computing device 108 can mark the locations where the vehicle detection module detected potential metal objects, and then the user can go to those locations and use the metal detection system such as those shown in FIGS. 1 to 6 to explore the locations in greater detail. Use of the remote controlled vehicle having a detection module allows the user 90 to explore a larger area in a given amount of time, as compared to not using the remote controlled vehicle.

In some examples, the vehicle can be an unmanned self-driving vehicle that receives initial instructions from the computing device 108 regarding what regions to explore, then explores the assigned regions without being remotely controlled by the computing device 108. In some examples, the unmanned vehicle can generate a route by itself based on intended detection areas designated by the user 90. After traversing the intended detection areas, the unmanned vehicle can generate a "treasure map" showing the locations of potential metal objects within the designated areas on the map.

Similarly, an unmanned aerial vehicle (UAV) that can hover close to the ground can be equipped with a metal detection module that can detect underground metal objects. The unmanned aerial vehicle can be controlled by the computing device 108 to explore a region that has been selected by the user 90. The unmanned aerial vehicle includes a positioning module, such as a GPS module, to allow the computing device 108 to track the position of the unmanned aerial vehicle. The unmanned aerial vehicle can include a height control module that controls the unmanned aerial vehicle to hover above the ground at a height determined by the user. The unmanned aerial vehicle can include an obstacle avoidance module for detecting obstacles in the flight path of the UAV, and for controlling the UAV to go around the obstacles to avoid bumping or crashing into the obstacles. The metal detection module can be mounted on the underside of the unmanned aerial vehicle, and the unmanned aerial vehicle can include a control module for processing the electromagnetic signals detected by the detection module. When the unmanned aerial vehicle detection module picks up a signal that resembles those emitted by an underground metal object, the control module sends a signal to the computing device 108. The computing device 108 can mark the locations where the unmanned aerial vehicle detection module detected potential metal objects, and then the user can go to those locations and use the metal detection system such as those shown in FIGS. 1 to 6 to explore the locations in greater detail. Use of the remote controlled unmanned aerial vehicle having a detection module allows the user 90 to explore a larger area in a given amount of time, as compared to not using the remote controlled unmanned aerial vehicle.

In some examples, the unmanned aerial vehicle can be an autonomous unmanned aerial vehicle that receives initial instructions from the computing device 108 regarding what regions to explore, then explores the assigned regions without being remotely controlled by the computing device 108. In some examples, the unmanned aerial vehicle can generate a route by itself based on intended detection areas designated by the user 90. After traversing the intended detection areas, the unmanned aerial vehicle can generate a "treasure map" showing the locations of potential metal objects within the designated areas on the map.

In some examples, a plurality of land-based vehicles and unmanned aerial vehicles can jointly explore a region and transmit the results of the metal detection activities to the computing device 108. This allows the user 90 to spend more time at regions where the probability of finding metal objects is high.

Figure 21:
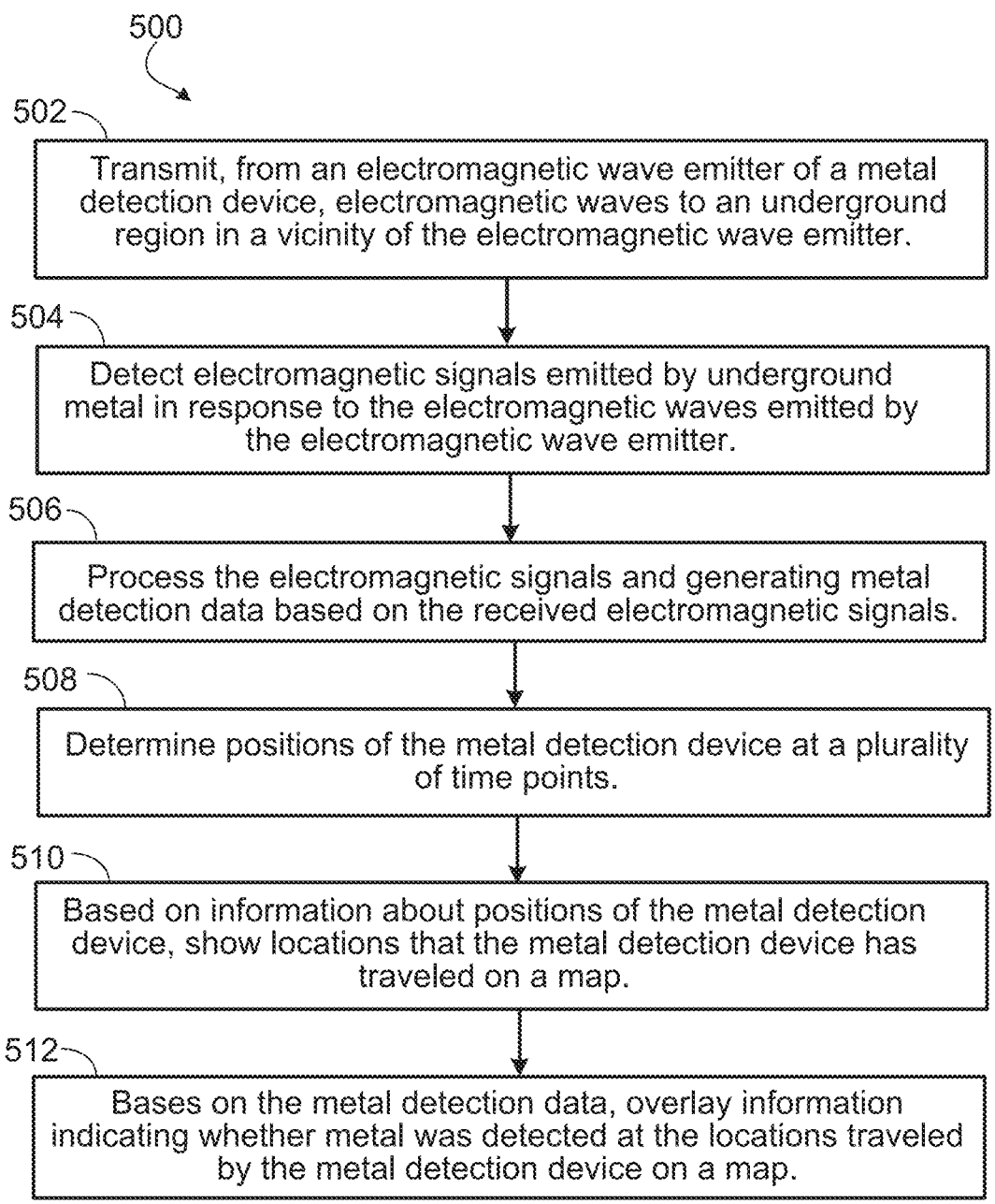
FIG. 21 is a flow diagram of an exemplary process for metal detection.

Referring to FIG. 21, in some implementations, a metal detection system executes a process 500 for metal detection. In operation, the metal detection system transmits (502), from an electromagnetic wave emitter of a metal detection device, electromagnetic waves to an underground region in a vicinity of the electromagnetic wave emitter. The metal detection system detects (504) electromagnetic signals emitted by underground metal in response to the electromagnetic waves emitted by the electromagnetic wave emitter. The metal detection system processes (506) the electromagnetic signals and generates metal detection data based on the received electromagnetic signals. The metal detection system determines (508) positions of the metal detection device at a plurality of time points. The metal detection system, based on the information about positions of the metal detection device, shows (510) locations that the metal detection device has traveled on a map. The metal detection system, based on the metal detection data, overlays (512) information indicating whether metal was detected at the locations traveled by the metal detection device on the map.

Implementations of the process 500 can have one or more of the following features. The metal detection system can generate information about types of metal that are detected at the locations traveled by the metal detection device, and overlay the information about the types of metal on the map. Processing the electromagnetic signals and generating metal detection data based on the received electromagnetic signals can be performed at a control module, and overlaying information indicating whether metal was detected at the locations traveled by the metal detection device on the map can be performed at a computer module. The metal detection system can wirelessly transmit the metal detection data from the control module to the computer module. Wirelessly transmitting the metal detection data from the control module to the computer module can include wirelessly transmitting the metal detection data from the control module to the computer module according to at least one of Bluetooth protocol, Wi-Fi protocol, or cellular transmission protocol. The computer module can include at least one of a mobile phone, a tablet computer, or a notebook computer. The metal detection system can use the computer module to download new firmware for the control module from a remote server computer, wirelessly transmit the new firmware from the computer module to the control module, and install the new firmware on the control module.

The metal detection system can sense movements of the metal detection device, and based on the sensed movements of the metal detection device, provide a user of the metal detection system information regarding recommended movements of the detection module. The information regarding recommended movements of the detection module can include at least one of information indicating that the user should modify a speed of sweeping motion, information indicating that the user should modify a frequency of sweeping motion, or information indicating that the user should reduce a speed of travel. The metal detection system can generate signals representing movements of the metal detection system, and determine at least one of a speed of a sweeping motion, or a frequency of the sweeping motion. The metal detection system can receive an instruction from a user, and in response to the instruction from the user, perform at least one of (i) sending a message that includes a map having overlay information about metal detection, or (ii) posting a map having overlay information about metal detection to a web site. The map can having overlay information about metal detection can include a map having overlay information about at least one of (i) locations that the metal detection device has been to, (ii) whether metal was detected at the locations that the metal detection device has been to, or (iii) the types of metal that were detected at the locations that the metal detection device has been to. The metal detection system can show one or more regions on a map representing locations where a user has already surveyed for metal, and information about at least one of (i) regions in which metal has been detected, or (ii) regions in which metal has not been detected.

In some implementations, the control module 116, 152, 182, the signal processing and wireless module 474, and the computing device 108 can include one or more processors and one or more computer-readable media (e.g., RAM, ROM, SDRAM, hard disk, optical disk, and flash memory). The one or more processors can perform various calculations described above. The calculations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., general-purpose microprocessors, special purpose microprocessors, digital signal processors, single-core or multi-core processors, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM, DVD-ROM, and Blu-ray BD-ROM disks. The processor and the memory can be supplemented by, or incorporated in, ASICs (application-specific integrated circuits).

Particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Although some examples have been discussed above, other implementations and applications are also within the scope of the following claims. For example, the user interfaces shown in FIGS. 7-18 can be modified. The metal detection systems described above can include more or less functions than described.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:
1. A metal detection system, comprising:
   a detection module comprising
      a first electromagnetic wave emitter configured to emit electromagnetic waves to a region in a vicinity of the detection module, and
      a first electromagnetic wave receiver configured to sense electromagnetic signals emitted by underground metal in response to the electromagnetic waves emitted by the first electromagnetic wave emitter;
   a control module configured to perform at least one of (i) processing the electromagnetic signals received by the first electromagnetic wave receiver and generate metal detection data based on the received electromagnetic signals, or (ii) processing output signals provided by the detection module and generate metal detection data based on the output signals provided by the detection module, in which the output signals are derived from the electromagnetic signals received by the first electromagnetic wave receiver;
   a positioning module configured to generate information about positions of the metal detection device; and
   a computer module comprising
      a storage device configured to store an application program,
      a data processor configured to execute instructions in the application program and perform:
         based on the information about positions of the metal detection device generated by the positioning module, showing locations that the metal detection device has traveled on a map, and based on the metal detection data, overlaying information indicating whether metal was detected at the locations traveled by the metal detection device on the map, the application program includes instructions that when executed by the data processor cause the data processor to receive an instruction from a user, and in response to the instruction from the user, perform at least one of (i) send a message that includes a map having overlay information about metal detection associated with the metal detection system, or (ii) post a map having overlay information about metal detection associated with the metal detection system to at least one of a second application program executing on the computer module or a web site.

2. The metal detection system of claim 1 in which the application program includes instructions that when executed by the data processor cause the data processor to generate information about types of metal that are detected at the locations traveled by the metal detection device, and overlay the information about the types of metal on the map.

3. The metal detection system of claim 1 in which the control module and the computer module communicate with each other wirelessly.

4. The metal detection system of claim 3, comprising a communication module to enable the control module and the computer module to communicate to each other wirelessly.

5. The metal detection system of claim 4 in which the communication module transmits wireless signals between the control module and the computer module according to at least one of Bluetooth protocol, Wi-Fi protocol, or cellular transmission protocol.

6. The metal detection system of claim 1 in which the computer module comprises at least one of a smart watch, smart eyeglasses, a mobile phone, a tablet computer, or a notebook computer.

7. The metal detecting system of claim 6, comprising
a communication module to enable the control module and the computer module to communicate to each other wirelessly, in which the communication module is configured to receive from the computer module at least one of SMS text messages, news alerts, or call tips, and
a display electrically coupled to at least one of the control module or the communication module to show the at least one of SMS text messages, news alerts, or call tips.

8. The metal detection system of claim 1 in which the application program includes instructions that when executed by the data processor cause the data processor to:
download, from a remote server computer, new firmware for the control module, and
wirelessly transmit the new firmware from the computer module to the control module.

9. The metal detection system of claim 1, comprising at least one sensor to generate signals representing movements of the metal detection system, in which the application program includes instructions that when executed by the data processor cause the data processor to, based on the signals representing the movements of the metal detection system, provide to a user of the metal detection system information regarding recommended movements of the detection module.

10. The metal detection system of claim 9 in which information regarding recommended movements of the detection module includes at least one of information indicating that the user should reduce a speed of left-and-right sweeping motion, a frequency of left-and-right sweeping motion, or information indicating that the user should reduce a speed of travel.

11. The metal detection system of claim 1, comprising at least one sensor to generate signals representing movements of the metal detection system, in which the application program includes instructions that when executed by the data processor cause the data processor to determine at least one of a speed of a sweeping motion, or a frequency of the sweeping motion.

12. The metal detection system of claim 1 in which the map having overlay information about metal detection comprises a map having overlay information about at least one of (i) locations that the detection module has been to, (ii) whether metal was detected at the locations that the detection module has been to, or (iii) the types of metal that were detected at the locations that the detection module has been to.

13. The metal detection system of claim 1 in which the application program includes instructions that when executed by the data processor cause the data processor to show one or more regions on a map representing locations where a user has already surveyed for metal, information about at least one of (i) regions in which metal has been detected, or (ii) regions in which metal has not been detected.

14. The metal detection system of claim 1 in which the detection module comprises a coarse position metal detector and a fine position metal detector, the coarse position metal detector comprises the first electromagnetic wave emitter and the first electromagnetic wave receiver, the fine position metal detector comprises a second electromagnetic wave emitter and a second electromagnetic wave receiver, the fine position metal detector is configured to provide a more accurate position of detected metal compared to the position of detected metal provided by the coarse position metal detector.

15. The metal detection system of claim 1, comprising a display to show information related to metal detection operations.

16. The metal detection system of claim 1 in which the application program includes instructions that when executed by the data processor cause the data processor to transmit information regarding at least one of type of metal, location of metal, buried depth of metal, soil structure, or firmware of the control module to a remote server.

17. The metal detection system of claim 1 in which the application program includes instructions that when executed by the data processor cause the data processor to provide information about a position of a metal detection gear.

18. The metal detection system of claim 17 in which the metal detection gear comprises at least one of the control module, the detection module, the positioning module, a communication module that enables the control module to communicate with the computer module, or a pinpointing probe.

19. The metal detection system of claim 17 in which the application program includes instructions that when executed by the data processor cause the data processor to, for each metal detection gear that is wirelessly connected to the computer module, record position coordinates of a last known position of the metal detection gear.

20. The metal detection system of claim 19 in which the position coordinates of last known position of the metal detection gear is approximated by position coordinates of the positioning module before the metal detection gear is disconnected from the computer module.

21. The metal detection system of claim 19 in which the application program includes instructions that when executed by the data processor cause the data processor to, in response to a user input seeking information about a position of a particular metal detection gear, provide recorded position coordinates of the last known position of the particular metal detection gear.

22. The metal detection system of claim 1 in which the application program includes instructions that when executed by the data processor cause the data processor to detect wireless signals transmitted by a metal detection gear and show signal strengths of the wireless signals transmitted by the metal detection gear.

23. The metal detection system of claim 1 in which the application program includes instructions that when executed by the data processor cause the data processor to provide a list of gears, and upon receiving a user input requesting information about a position of a particular gear, detect wireless signals transmitted by the particular gear and provide an estimate of a direction of the particular gear based on the detected wireless signals.

24. The metal detection system of claim 1 in which the detection module sends the output signals to the control module wirelessly.

25. The metal detection system of claim 24, comprising a support to support the detection module and the control module, the support including a rod having a first portion pivotly coupled to the detection module and a second portion coupled to the control module,
wherein the detection module includes:
a circuit board having circuitry for processing the electromagnetic signals received by the first electromagnetic wave receiver, and
a wireless module for sending the output signals wirelessly to the control module.

26. A method comprising:
transmitting, from an electromagnetic wave emitter of a metal detection device, electromagnetic waves to an underground region in a vicinity of the electromagnetic wave emitter;
detecting electromagnetic signals emitted by underground metal in response to the electromagnetic waves emitted by the electromagnetic wave emitter;
processing the electromagnetic signals and generating metal detection data based on the received electromagnetic signals;
determining positions of the metal detection device at a plurality of time points;
based on the information about positions of the metal detection device, showing locations that the metal detection device has traveled on a map; and
based on the metal detection data, overlaying information indicating whether metal was detected at the locations traveled by the metal detection device on the map; and
receiving an instruction from a user, and in response to the instruction from the user, performing at least one of (i) sending a message that includes a map having overlay information about metal detection, or (ii) posting a map having overlay information about metal detection to a web site.

27. The method of claim 26, comprising generating information about types of metal that are detected at the locations traveled by the metal detection device, and overlaying the information about the types of metal on the map.

28. The method of claim 26, wherein processing the electromagnetic signals and generating metal detection data based on the received electromagnetic signals is performed at a control module,
wherein overlaying information indicating whether metal was detected at the locations traveled by the metal detection device on the map is performed at a computer module, and
the method comprises wirelessly transmitting the metal detection data from the control module to the computer module.

29. The method of claim 28 in which wirelessly transmitting the metal detection data from the control module to the computer module comprises wirelessly transmitting the metal detection data from the control module to the computer module according to at least one of Bluetooth protocol, Wi-Fi protocol, or cellular transmission protocol.

30. The method of claim 28 in which the computer module comprises at least one of a mobile phone, a tablet computer, or a notebook computer.

31. The method of claim 28, comprising:
using the computer module to download new firmware for the control module from a remote server computer,
wirelessly transmitting the new firmware from the computer module to the control module, and
installing the new firmware on the control module.

32. The method of claim 26, comprising
sensing movements of the metal detection device, and
based on the sensed movements of the metal detection device, providing a user of the metal detection system information regarding recommended movements of the detection module.

33. The method of claim 32 in which information regarding recommended movements of the detection module include at least one of information indicating that the user should modify a speed of sweeping motion, information indicating that the user should modify a frequency of sweeping motion, or information indicating that the user should reduce a speed of travel.

34. The method of claim 26, comprising generating signals representing movements of the metal detection system, and determining at least one of a speed of a sweeping motion, or a frequency of the sweeping motion.

35. The method of claim 26 in which the map having overlay information about metal detection comprises a map having overlay information about at least one of (i) locations that the metal detection device has been to, (ii) whether metal was detected at the locations that the metal detection device has been to, or (iii) the types of metal that were detected at the locations that the metal detection device has been to.

36. The method of claim 26, comprising showing one or more regions on a map representing locations where a user has already surveyed for metal, and information about at least one of (i) regions in which metal has been detected, or (ii) regions in which metal has not been detected.

* * * * *